United States Patent [19]
Page et al.

[11] Patent Number: 5,565,149
[45] Date of Patent: Oct. 15, 1996

[54] CONTROL OF DISSOLVED GASES IN LIQUIDS

[75] Inventors: John K. R. Page, Camberley, United Kingdom; Dilip G. Kalthod, St. Louis, Mo.

[73] Assignee: Permea, Inc., St. Louis, Mo.

[21] Appl. No.: 594,968

[22] Filed: Jan. 31, 1996

Related U.S. Application Data

[63] Continuation-in-part of Ser. No. 404,807, Mar. 15, 1995, abandoned, and Ser. No. 404,806, Mar. 15, 1995, abandoned.

[51] Int. Cl.⁶ ........................................ B01F 3/04
[52] U.S. Cl. ................. 261/140.1; 261/DIG. 7; 261/122.1; 261/104; 210/321.8
[58] Field of Search ............... 261/DIG. 7, 122.1, 261/104, 140.1; 210/321.8

[56] References Cited

U.S. PATENT DOCUMENTS

| | | | |
|---|---|---|---|
| 3,397,871 | 8/1968 | Hasselberg | 261/DIG. 7 |
| 3,780,198 | 12/1973 | Pahl et al. | 261/DIG. 7 |
| 4,364,493 | 12/1982 | Raynes et al. | 222/399 |
| 4,517,135 | 5/1985 | Szereny et al. | 261/104 |
| 4,610,888 | 9/1986 | Teng et al. | 426/569 |
| 4,927,567 | 5/1990 | Rudick | 261/DIG. 7 |
| 4,950,431 | 8/1990 | Rudick et al. | 261/DIG. 7 |
| 5,029,733 | 7/1991 | Hedderick et al. | 222/96 |
| 5,059,374 | 10/1991 | Krueger et al. | 210/321.8 |
| 5,062,548 | 11/1991 | Hedderick et al. | 222/190 |
| 5,232,601 | 8/1993 | Chu et al. | 210/321.8 |
| 5,294,338 | 3/1994 | Kamo et al. | 210/321.8 |

FOREIGN PATENT DOCUMENTS

| | | |
|---|---|---|
| 2684088 | 5/1993 | France . |
| 2247225 | 2/1992 | United Kingdom . |

*Primary Examiner*—Tim R. Miles
*Attorney, Agent, or Firm*—Martha A. Michaels; Mark L. Rodgers; William F. Marsh

[57] ABSTRACT

The present invention provides a gas/liquid contactor module having hollow fiber membranes and a process for controlling dissolved gases in liquids such as water, beer and the like, by passing the liquid through the shell side of the contactor module to allow addition or removal of dissolved gases by the diffusion of the gases through the membranes into or from the hollow fiber bores. The process permits control of the quantity of such dissolved gases as carbon dioxide and nitrogen.

26 Claims, 12 Drawing Sheets

CONTROL OF DISSOLVED GASES IN LIQUIDS

TECHNICAL FIELD OF THE INVENTION

This application is a continuation-in-part of copending applications U.S. Ser. No. 08/404,807 filed Mar. 15, 1995, now abandoned, and U.S. Ser. No. 08/404,806 filed Mar. 15, 1995, now abandoned.

The present invention relates to the control of dissolved gases in liquids including beverages and particularly beer. The most common gases to be controlled are carbon dioxide and nitrogen. The raising or lowering of a concentration of a gas takes place in a contactor module containing hollow fiber membranes wherein the beer flows through the shell side of the module and gas is controlled by partial pressure regulation in the bores of the hollow fibers.

BACKGROUND OF THE INVENTION

Carbonation of liquids, particularly for beverages, has taken place for many years. Control of the degree of dissolution of carbon dioxide and other gases in liquids has led to a great deal of experimentation. In some instances, nitrogen has been used in the production and packaging of beers and other beverages primarily to exclude oxygen from the feed water and from contact with the final brewed or bottled product. In addition, it has been found desirable to use nitrogen in a dissolved state in alcoholic beverages, particularly beers, so as to influence the presentation of the beer when the beer is dispensed into the glass or mug.

Depending on the type of beer the carbonation varies, for instance, for a lager beer generally the carbonation level is about 2.5 volumes of carbon dioxide per volume of liquid, and for the dark stout beers that level is about 1.0. Many customers, particularly in Europe express a preference for a tight long-lasting head on dispensed beer. In spite of the presence of various long chain molecules in beers, which molecules have surfactant properties, the desired presentation of a tight long lasting head cannot be achieved with only carbon dioxide in solution. This is true because carbon dioxide is able to permeate rapidly through the thin walls of the initially formed bubbles on the surface of a dispensed beer and hence is lost to the atmosphere which contains a low concentration of carbon dioxide.

It would seem that because the carbon dioxide is supersaturated in the beer that the potential reserve of additional carbon dioxide to replace lost gas would be available. However, this is not normally true because the beer is cold and because modern glass washing methods do not create surface scratches and/or leave deposits which will nucleate carbon dioxide from solution after the beer has come to rest in the glass.

It is known that dissolving a quantity of a weakly soluble gas, conventionally nitrogen, in beer prior to dispense provides high quality presentation in the form of a stable white foam head. Because of its low solubility nitrogen gas which has been pre-dissolved in beer at elevated pressure will very rapidly precipitate out of solution when the beer drink flows through the dispense tap. This precipitation is in the form of a very fine dispersion of small bubbles which approaches its new lower equilibrium concentration at atmospheric pressure when the beer is dispensed.

Because these initially formed nitrogen bubbles are very small, they float slowly to the surface of the beer and some nucleate precipitation of dissolved carbon dioxide gas which enters them, causing them to grow and float faster. The small bubbles which collect at the surface thus contain nitrogen and a mixture of carbon dioxide and nitrogen gases. Because nitrogen, in comparison to carbon dioxide, is less able to permeate through the bubble wall, these bubbles are relatively stable, although they are losing carbon dioxide by permeation to the atmosphere. That loss tends to be made up by further carbon dioxide arising from the bulk of the beer in the glass. Hence the "head" on a nitrogenated beer lasts longer and is more appealing to most customers.

At the brewery or at a pub or restaurant, most beers are transported by means of pressure, generally supplied by carbon dioxide creating a high pressure of carbon dioxide in the vat or keg. Beer is transported from the vat to a bottling line or to a keg or possibly to a tap. Perhaps the most common transport of the beer for immediate presentation is from the keg to the tap. Fast transport of the beer by use of high carbon dioxide pressure, provides the risk of over carbonation of the beer. Over carbonation can lead to break out of carbon dioxide in the tubing upstream of the dispense tap when dispensing from a keg to a tap if there is a significant pressure drop in the delivery tubing. This leads to beer loss through "fobbing" i.e., production of excess foam before dispense and at the tap. In an attempt to prevent over carbonation a mixture of nitrogen and carbon dioxide gases has been used for pressure dispense of kegged beers. Although this technique helps to lessen the likelihood of over carbonation, control of a precise amount of carbonation is not feasible by this means.

It has been claimed that there is a causal relationship between the use of nitrogen in production and mixed gas in dispense. The reasoning is that if a beer has been nitrogenated initially then it should be dispensed with a mixed gas in order to maintain that nitrogenation to achieve the desired presentation effects. However, there are three implied requirements which are not independently achievable with the mixed gas dispense principle. These requirements are (1) a maximum total head pressure on the keg in order to achieve fast dispense flow rates; (2) the correct partial pressure of carbon dioxide to avoid over carbonation; and (3) the correct nitrogen partial pressure to maintain nitrogenation. No significant amount of nitrogenation of a keg beer will take place from the mixed gas pressure used for transport because at best only an equilibrium of partial pressures will be established and diffusion mobility of dissolved gases is very low in stagnant liquid layers. However, nitrogen can be lost to the head space from an initially nitrogenated beer. Commercial factors dictate in practice that the two most important requirements are a maximum total head pressure on the keg and the correct partial pressure of carbon dioxide. As a result, dispense with mixed gas is always tailored to maintaining beer carbonation and maximizing speed of dispense as opposed to maintaining the correct nitrogen content for the appeal in presentation.

Several attempts have been made to nitrogenate beer and/or control the carbon dioxide content of the beer. In French Patent application 2,684,088, a mixture of carbon dioxide and nitrogen is used as a propellant gas to transfer the beer from the keg to the tap. The pressure of the propellant gas is varied with the temperature prevailing in the stored cellar so as to ensure a constant carbon dioxide content in the beer. This method is said to maintain the optimal level of carbon dioxide in beer avoiding any desorption during transfer from the keg to the tap. However, this reference fails to deal with over carbonation or with nitrogenation.

U.S. Pat. No. 5,062,548 attempts to introduce nitrogen into the beer during the dispense operation via a restrictor at the point of dispense. All methods involving direct injection of gases at the point of dispense also have the potential drawback of sparging out desirable flavor constituents of the beer, reducing its taste and appeal. There is also a risk of bacterial growth in small orifices exposed to the beer, and effective cleaning of these orifices is difficult. This, of course, does not allow for finite control of the amount of nitrogen which may or may not dissolve in the beer, nor does it provide the very small size of bubbles of nitrogen gas which are needed to influence the presentation of the dispensed beer.

U.S. Pat. No. 5,029,733 also attempts to introduce nitrogen at the dispense point. In this case, the beverage is stored in a flexible bag and the beverage is then drawn off through a pipe and any gases desired are introduced into the beverage by way of a fixed orifice restrictor and a non-return valve. The pressure of the gas which is introduced can be adjusted; however, it can be readily seen that the control of the dissolution of nitrogen is not precise. Furthermore, the method is slow and is inconvenient.

In U.S. Pat. No. 4,610,888 a smooth stable foam is formed in a beer by intimately admixing a nitrogen containing gas, preferably air, by a venturi effect in a nozzle positioned on the beer tap. Here again some nitrogen may be introduced but the quantity is not controlled, the time to allow the nitrogen to dissolve is insufficient, and the bubbles formed are too large to affect presentation.

U.S. Pat. No. 4,364,493 provides a beverage dispensing system where the beverage is dispensed by a gaseous mixture of air and carbon dioxide. The system utilizes a diaphragm to control the admission of carbon dioxide to the container together with the air. However, this method does not assure the dissolution of nitrogen in the beer nor can it control either the carbon dioxide or nitrogen content accurately.

UK Patent application GB 2,472,225A provides a method and apparatus for dispensing gasified beverages wherein a gas permeable membrane is involved. The reference states that the beverage may be beer containing carbon dioxide in solution and where the membrane is permeable to carbon dioxide, the pressurizing gas should be a mixture of carbon dioxide and nitrogen, but where the membrane is impermeable to carbon dioxide, nitrogen may be used alone.

The present invention provides a process and apparatus to dissolve a gas in a liquid including beverages, e.g., water, soda, wine, beer and the like. With respect to beer, the present invention will (1) provide a maximum head pressure on the beer in storage to achieve fast transport flow rates; (2) provide the correct partial pressure of carbon dioxide to avoid either high or low carbonation; and (3) provide the correct partial pressure of nitrogen in the beer for a high quality presentation to the customer.

SUMMARY OF THE INVENTION

The present invention provides a process and apparatus for controlling the quantity of a dissolved gas in a liquid to a predetermined level by bubble-less transfer of gas in a gas/liquid contactor module. The liquid is placed under a predetermined pressure and transported into the shell side of the contactor module containing hollow fiber membranes. The bores of the hollow fibers contain a gas which is soluble in the liquid, the gas being under a predetermined pressure. If it is desired to raise the level of the gas dissolved in the liquid, the partial pressure of the gas in the bores of the fibers is maintained higher than the equilibrium partial pressure of the gas in the liquid in the shell side of the module. On the other hand, if it is desired to lower the level of the gas dissolved in the liquid the partial pressure of the gas in the bores of the fibers is maintained less than the equilibrium partial pressure of the gas in the liquid in the shell side of the module.

The permeable hollow fibers used in the contactor module of the present invention permit a high degree of flexibility of operation in respect of bore pressure and shell pressure, while retaining true bubble-less transfer of gases. Thus it is possible to achieve high rates of mass transfer of gas, irrespective of liquid pressure variation on the shell side. The liquid pressure only limits the ultimate equilibrium level of gas which can be dissolved in the liquid.

For instance to nitrogenate beer under pressure prior to dispense, the beer is transferred under pressure into the shell side of a contactor module containing hollow fibers. The bores of the fibers contain nitrogen under sufficient pressure to cause mass transfer of the nitrogen through the membrane and into the beer whereby the beer is nitrogenated to a predetermined level. Most generally, the beer is nitrogenated from about 15 to about 80 ppm by weight of dissolved nitrogen. The beer is then transported under pressure to a point of dispense or to storage. Air could be used to provide the same physical effect as nitrogen, since oxygen is similarly soluble. This can be accomplished, but it should be noted that oxygen in contact with beer can oxidize the beer and impair its flavor. The contactor module of FIG. 7 could be used just upstream of the dispense tap to minimize spoilage/wastage of the oxidized beer.

The present invention also provides a process for increasing or decreasing the carbon dioxide content of beer. When beer is placed under pressure using carbon dioxide gas to pressurize the container of beer, the carbon dioxide content tends to escalate; it therefore may be highly desirable to reduce the degree of carbonation of the beer before dispense. The process for reducing carbonation of beer comprises transporting the beer under pressure through a contactor module having hollow fiber membranes. The beer is transported to the shell side of the contactor module and the excess carbon dioxide is removed through the membranes into the bores of the hollow fibers and then removed from the contactor module. This process can be controlled to any desired level of reduction or in some cases an increase of carbonation.

After the carbonation level of the beer is adjusted, the nitrogen level may be adjusted by transporting the beer under pressure to another contactor module for dissolution of nitrogen into the beer as discussed above, or by retaining the beer under pressure in the module and increasing the pressure of nitrogen in the fiber bores sufficiently to dissolve the desired amount of nitrogen in the beer. Or alternatively, the nitrogen level in the beer may be adjusted and then the carbonation level adjusted. In this instance, after the nitrogen level is adjusted, it is preferred that the beer remain static in the module and at the time of dispense, the carbonation level is adjusted in the contactor module as the beer is being dispensed. These two steps are carried out in a single module, or two or more modules as desired.

The process of the present invention may be applied to a continuous flow mode, e.g. a bottling operation for soda or beer, or to an intermittent flow mode, e.g. from a keg to one or more taps in a pub or to taps in a soda fountain or the like.

The apparatus of the present invention comprises at least one contactor module having hollow fiber membranes which under the operating conditions of the process are non-flooding membranes. Non-flooding membranes are those which when the exterior of the fiber is surrounded by liquid under operating pressures, none of the liquid permeates through the fiber. The hollow fiber membranes further have an average pore size less than about 500 Angstroms as estimated by Knudsen's flow equation (One method for calculating the pore size is set forth in the Journal of Membrane Science, Vol. 73, 1992, pp 47–53 in an article entitled Characterization of Membrane Skin Defects by Gas Permeation Methods by Uchytil P. et al), preferably less than about 200, and a membrane surface having less than 0.1% holes, and having a P/I for carbon dioxide greater than about $50 \times 10^{-6}$ to about $5{,}000 \times 10^{-6}$ $cm^3/cm^2 \cdot sec \cdot cmHg$. The hollow fiber membranes are present in the contactor module in an amount of at least about 25 sq cm of membrane surface area per ml of liquid volume for a liquid flow rate of about 2 liters/minute.

The apparatus further comprises a means for controlling the pressure and flow of the liquid through the shell side of the module. In the continuous mode the flow is controlled by conventional pressure and flow regulators which provide a substantially constant pressure and flow rate. In the intermittent mode the pressure within the liquid line is substantially constant and the start and stop of the liquid flow is controlled by a check valve upstream of the contactor module. Conventionally when beer is transported from a keg to a tap, the exit from the keg is controlled by a check valve. If the keg check valve is operating properly, it may not be necessary to provide a check valve just upstream of the contactor module near the entry port. Conventional line and dispense equipment is suitable for transporting a beverage from the contactor module to the tap.

The pressure of gases in the bores of the hollow fibers in the contactor module are controlled by relieving type pressure regulators. In the instance of the continuous mode, the flow of the gas in the bores is controlled to provide the desired partial pressure of the gas in the bores and hence controls the dissolution of the gas in the liquid. In the dispense mode, the pressure of the gas in the bores is controlled to provide the desired partial pressure of the gas in the bores of the fibers and hence the desired equilibrium partial pressure of the dissolved gas in the liquid.

The present invention also provides a process for the bubble-less carbonation of water, particularly suitable for a soda dispense system. The process comprises transporting water through a check valve into the shell side of a contactor module described above at a pressure of at least about 20 psig. Simultaneously, carbon dioxide is transported under pressure through the bores of the hollow fibers where pressure is sufficient to provide the desired carbonation of the water. The carbonation of water ranges from about 1:1 to about 10:1 carbon dioxide volume to water volume. After carbonation of the water, the water is transported to a soda dispense station or a bottling operation or the like. Up until the dispense or bottling of the carbonated water, the dissolved carbon dioxide remains in bubble-less form.

It may be desirable to degas the feed water to a contactor module because dissolved air gases come out of solution within the contactor module and can reduce the effective partial pressure of carbon dioxide acting to carbonate the water. The degree to which the feed water is degassed depends on the amount of dissolved air in the feed water, the dissolved air often exceeding 15 psi.

The invention also provides a carbonation apparatus suitable for the carbonation of water, the water to be used at a soda dispense station. The apparatus comprises a contactor module containing the hollow fiber membranes described above, a source of water under pressure connected for shell side feed to the module, a source of carbon dioxide under pressure connected for fiber bore side feed to the module, a check valve located at the water feed inlet as the last control of the water as it enters the shell side of the module, and a temperature control to control the temperature of the water in the apparatus and until the resulting carbonated water is dispensed.

The gas/liquid contactor module appropriate for this invention is ideally suited to the application involving intermittent and/or irregular operation of a soda dispense station to produce soda for soft drinks. The apparatus described above, including the gas/water contactor module, eliminates the need for the carbonator tank, level controls, the high-pressure water feed pump, and associated electrical wiring and relays. The contactor module is of sufficiently small size to allow it to be fitted within existing dispensary equipment by immersion in the existing icebanks, leaving adequate space for the installation of larger fluid cooling coils, if desired. Normal tap water pressure generally is sufficient to provide for carbonation of the water and for dispensing the carbonated water, resulting in the elimination of any pump.

The water contacts carbon dioxide in the contactor module at the outer surfaces of the hollow fiber membranes, whereas, the carbon dioxide is fed to the bores of the hollow fiber membranes, and is transported in a bubble-less fashion into the water on the shell side of the module. At a given operating temperature, and constant water/soda flow rate, the level of carbonation produced is a function of pressure of the carbon dioxide feed gas applied to the bore side of the fibers in the module, provided that this differential pressure is not sufficient to produce bubbles of carbon dioxide on the liquid side. The carbonated water contains no bubbles until it is dispensed at the dispense station, and thus, has exited from the water carbonation system.

DETAILED DESCRIPTION OF THE INVENTION

Figure 1:
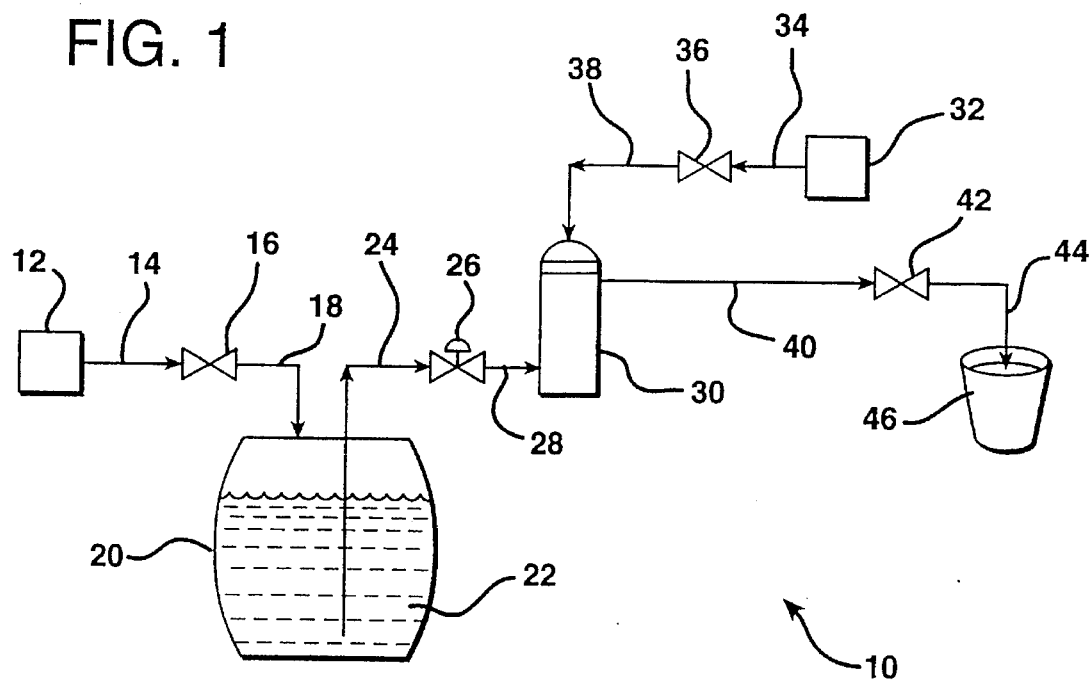
FIG. 1 is a schematic of one embodiment of the present invention.
Figure 4:
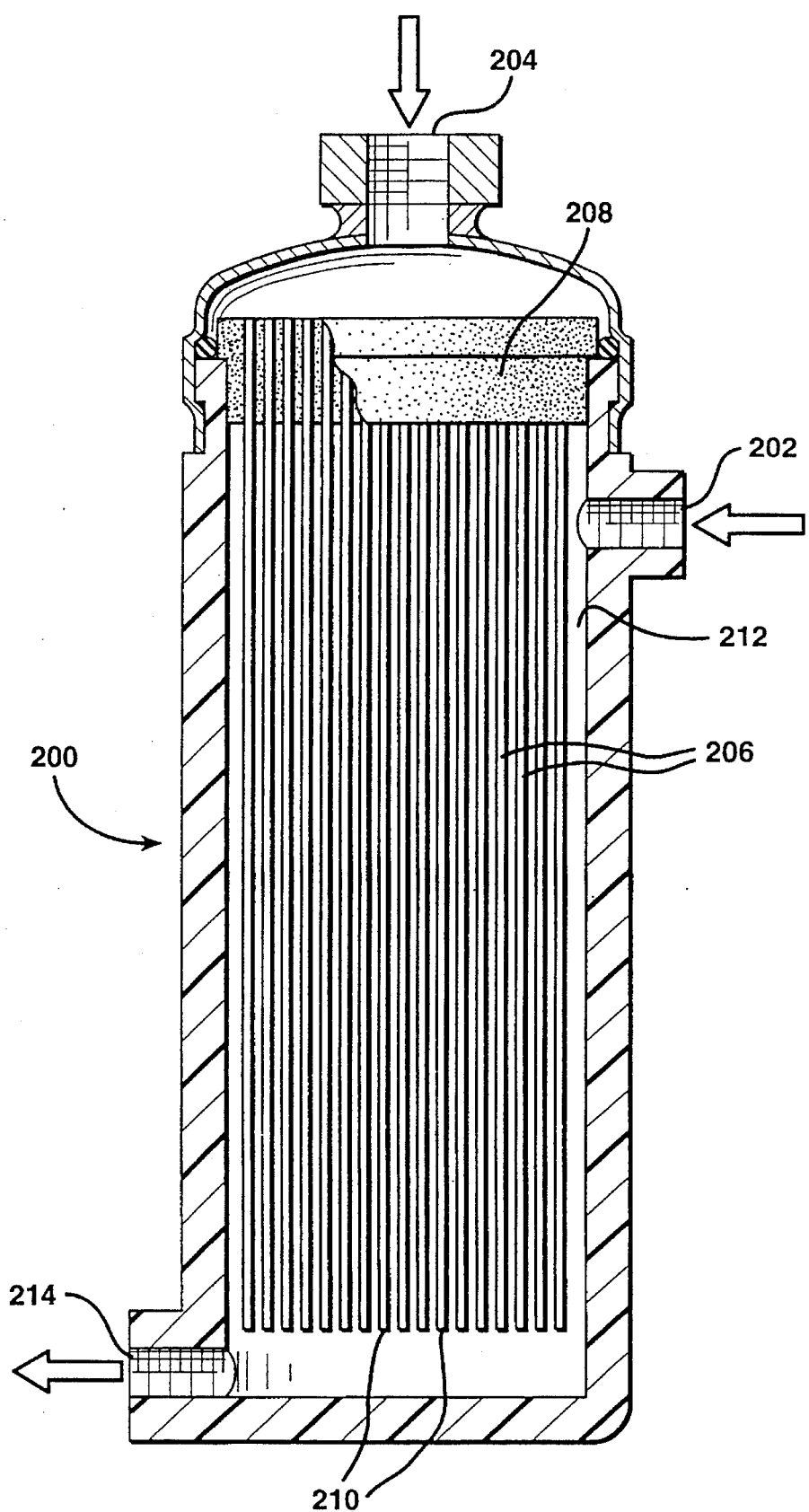
FIG. 4 is a side elevational view with a partial breakaway illustrating a contactor module suitable for an embodiment of the present invention.

FIG. 1 is a schematic of a process 10 of the present invention. A source of carbon dioxide 12 under pressure is passed through a line 14 to a control valve 16 which controls the pressure and ingress of carbon dioxide through a line 18 into the head space of a keg 20 containing beer 22. The pressure of the carbon dioxide is sufficient to cause the beer 22 to flow through a line 24 to a check valve 26 which controls the flow through a line 28 into a contactor module 30. A suitable module is illustrated in FIG. 4. The beer passes through the shell side of the module to an outlet into a line 40. While the beer is in the module 30, nitrogen from a nitrogen source 32 is passed through a line 34 to a control valve 36. The control valve maintains a pressure of nitrogen through a line 38 into the bore side of the hollow fibers of the contactor module 30 while the beer 22 is in the contactor module 30. The nitrogen is dissolved to the desired degree regulated by the amount of nitrogen partial pressure controlled by the valve 36. When a glass 46 of beer is desired, the dispense valve 42 opens and beer is dispensed through a line 44 into the glass 46. At the same time the dispense valve 42 opens, the check valve 26 opens to allow more beer to flow into the contactor module 30 so that additional beer will be nitrogenated and on demand dispensed through a line 40.

Figure 2:
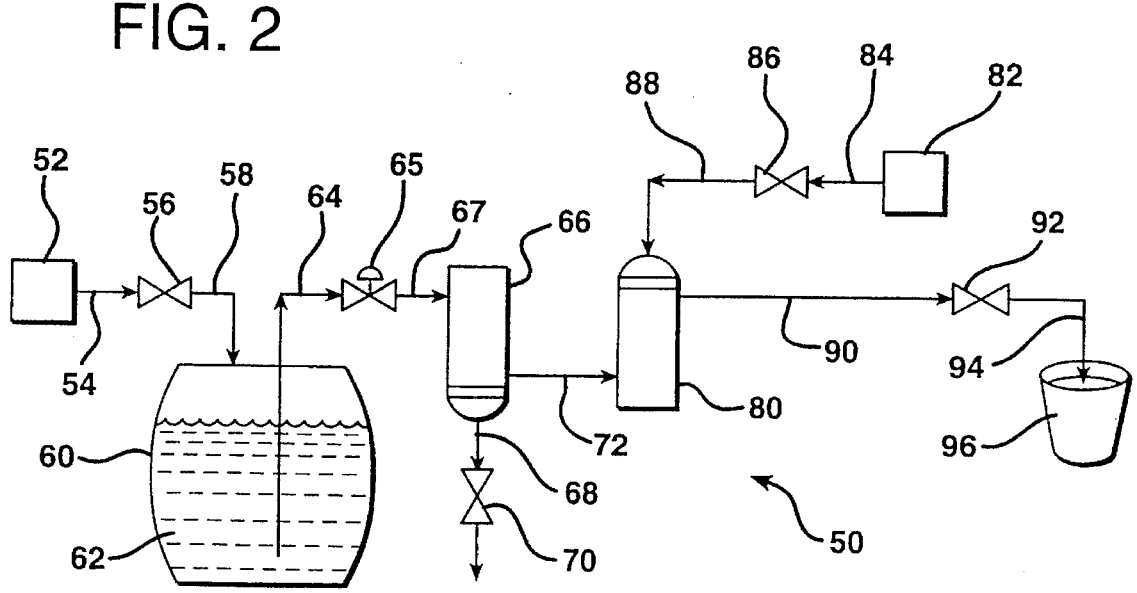
FIG. 2 is a schematic of another embodiment of the present invention.

FIG. 2 is a schematic illustrating another process 50 whereby beer is treated. A source of carbon dioxide 52 flows under pressure through a line 54 to a control valve 56. The control valve 56 regulates the pressure of carbon dioxide flowing through a line 58 into a keg 60. The pressure of the carbon dioxide is sufficient to deliver beer 62 through a line 64 to a check valve 65 and hence through a line 67 to a contactor module 66 and here it is assumed that this results in over carbonation of the beer in the keg. The contactor module 66 is further illustrated in FIG. 5. Returning now to FIG. 2 the carbon dioxide content of the beer is reduced in the module 66 by allowing carbon dioxide to exit from the liquid beer permeating the hollow fibers of the contactor module into the bores of the fibers, whereupon the excess carbon dioxide exits through a line 68 to a control valve 70 which control valve regulates the carbon dioxide content of the beer by opening and releasing carbon dioxide when the carbon dioxide content of the beer in the module 66 is too high.

The beer having been trimmed or reduced in carbon dioxide content then passes from the module 66 through an exit port to a line 72. The line 72 transports the beer to a contactor module 80. The beer flows into the shell side of the contactor module 80 and receives nitrogen so as to dissolve a predetermined portion of nitrogen into the beer. The nitrogen is provided by a source 82 under pressure through a line 84 to a control valve 86. The control valve 86 maintains the desired partial pressure of nitrogen through a line 88 into the contactor module 80 where the nitrogen feeds into the bore side of the hollow fibers and consequently the nitrogen is mass transferred through the hollow fiber walls and dissolved in the beer contained in the contactor module 80. The beer exits the module 80 through a line 90 to a dispense valve 92.

When the dispense valve 92 opens, the beer flows through a line 94 into a glass 96 and simultaneously the check valve 65 opens whereupon the module 80 is refilled from the module 66 through the line 72 while the module 66 is refilled through the line 67. Thus the beer dispensed from the process 50 has both the desired carbon dioxide content and the desired nitrogen content and is transported rapidly to the tap because the pressure in the keg is as high as desired.

Figure 3:
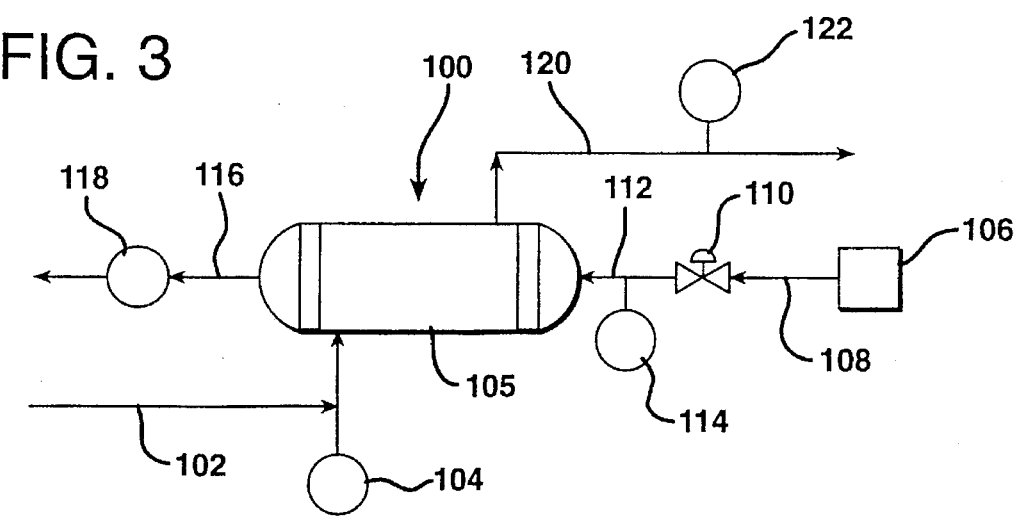
FIGS. 3, 3A and 3B are schematics of a further embodiment of the present invention.
Figure 3A:
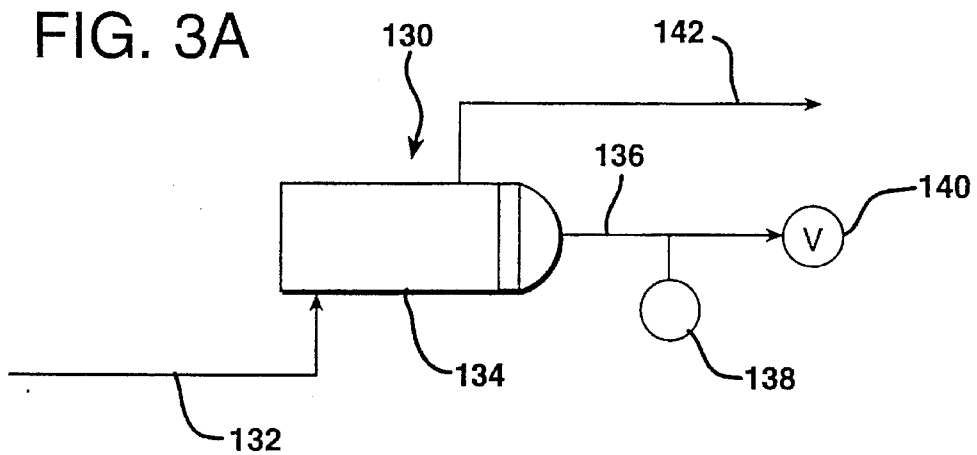
Figure 3B:
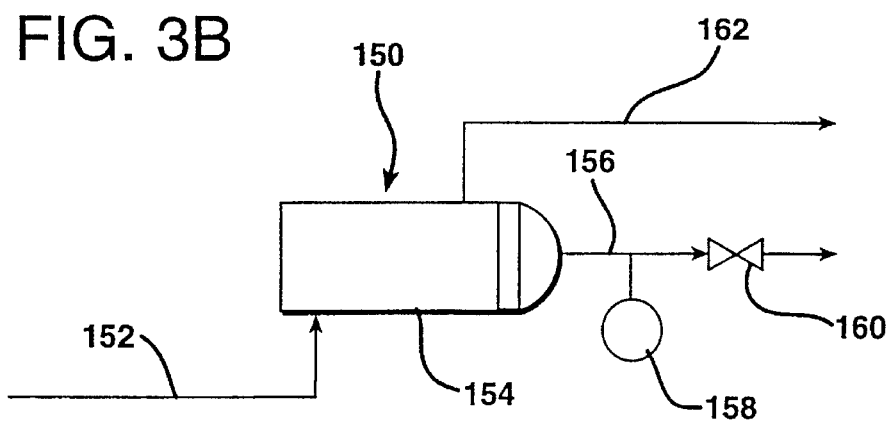

FIGS. 3, 3A and 3B are schematics which illustrate process configurations utilized in a continuous flow mode. In FIG. 3 a process 100 reduces the carbon dioxide content of beer in a continuous flow mode. The beer enters the contactor module 105 through a line 102 monitored by a pressure gauge 104. The pressure is substantially constant. Simultaneously nitrogen supplied by a source 106 passes through a line 108 under pressure to a pressure regulator valve 110 and then into the bores of the fibers in the contactor module 105 through a line 112 monitored by a pressure gauge 114. The pressure in the line 112 of the nitrogen is regulated by the valve 110 in response to the gauge. The nitrogen flows through the bores of the hollow fibers countercurrent to the flow of the beer in the module 105 to a line 116 monitored by a flow regulator 118. The flow rate of the nitrogen gas stream is responsive to a monitor 122 which reads the partial pressure of the carbon dioxide in the exit flow line 120 of the beer. Hence the flow rate of the nitrogen exiting the module 105 through the line 116 is adjusted up or down by the regulator 118 as needed to maintain a constant carbon dioxide partial pressure in the beer leaving the process. The counter flow nitrogen acts as a sweep gas to remove some of the carbon dioxide from the beer through the fibers into the bores of the hollow fibers in the contactor module 105 and hence through the exit line 116. The contactor module 105 is shown in detail in FIG. 6.

FIG. 3A depicts a process 130 for controlling the carbon dioxide content of beer where the temperature of the beer and the target carbonation level fixes the equilibrium partial pressure of carbon dioxide in the beer at a sub-atmospheric pressure and when a supply of nitrogen is not available. A vacuum is used to lower the pressure in the bores of the hollow fibers sufficiently to lower the equilibrium partial pressure of the carbon dioxide in the beer to a desired level. The process 130 removes excess carbon dioxide from beer passed under pressure through a line 132 into a contactor module 134 (see FIG. 5). The excess carbon dioxide is removed from the module 134 through a line 136 by means of a vacuum pump 140 from the bores of the hollow fiber membranes in the module 134. A pressure regulator 138 maintains a constant pressure in the line 136. The beer exits the module under pressure through a line 142.

FIG. 3B illustrates a process 150 for controlling the carbon dioxide content of beer where the desired equilibrium partial pressure of the beer is higher than atmospheric pressure, but still needs to be reduced to reach the target. Beer, under pressure, enters a contactor module 154 (see FIG. 5) through a line 152. In the module 154 excess carbon dioxide permeates the hollow fiber membranes into the bores of the membranes and exits the process through a line 156 through a control valve 160 which is regulated by a regulator gauge 158. The partially decarbonated beer exits the process through a line 162.

Each of FIGS. 3, 3A and 3B are related to processes utilized for a continuous flow mode.

FIG. 4 is a side elevational view of a contactor module 200. The module 200 receives beer into the shell side of the module through an inlet 202. The beer circulates throughout the shell side 212 of the module surrounding the fibers 206. The fibers 206 are hollow fibers which are non-flooding fibers thereby not allowing any beer to penetrate the fibers from the exterior, but having nitrogen supplied through an entry inlet 204 under pressure into the bores of the fibers. A tube sheet 208 seals the end of the module, however, the hollow fibers 206 penetrate the tubesheet and are open to receive the nitrogen through the entry inlet 204. At the other end of the module the hollow fibers 206 are sealed shut, e.g. with a hot knife cut, at the ends of the fibers 210. The beer which enters the shell side 212 at the inlet 202 leaves the module under pressure at an exit port 214.

Figure 5:
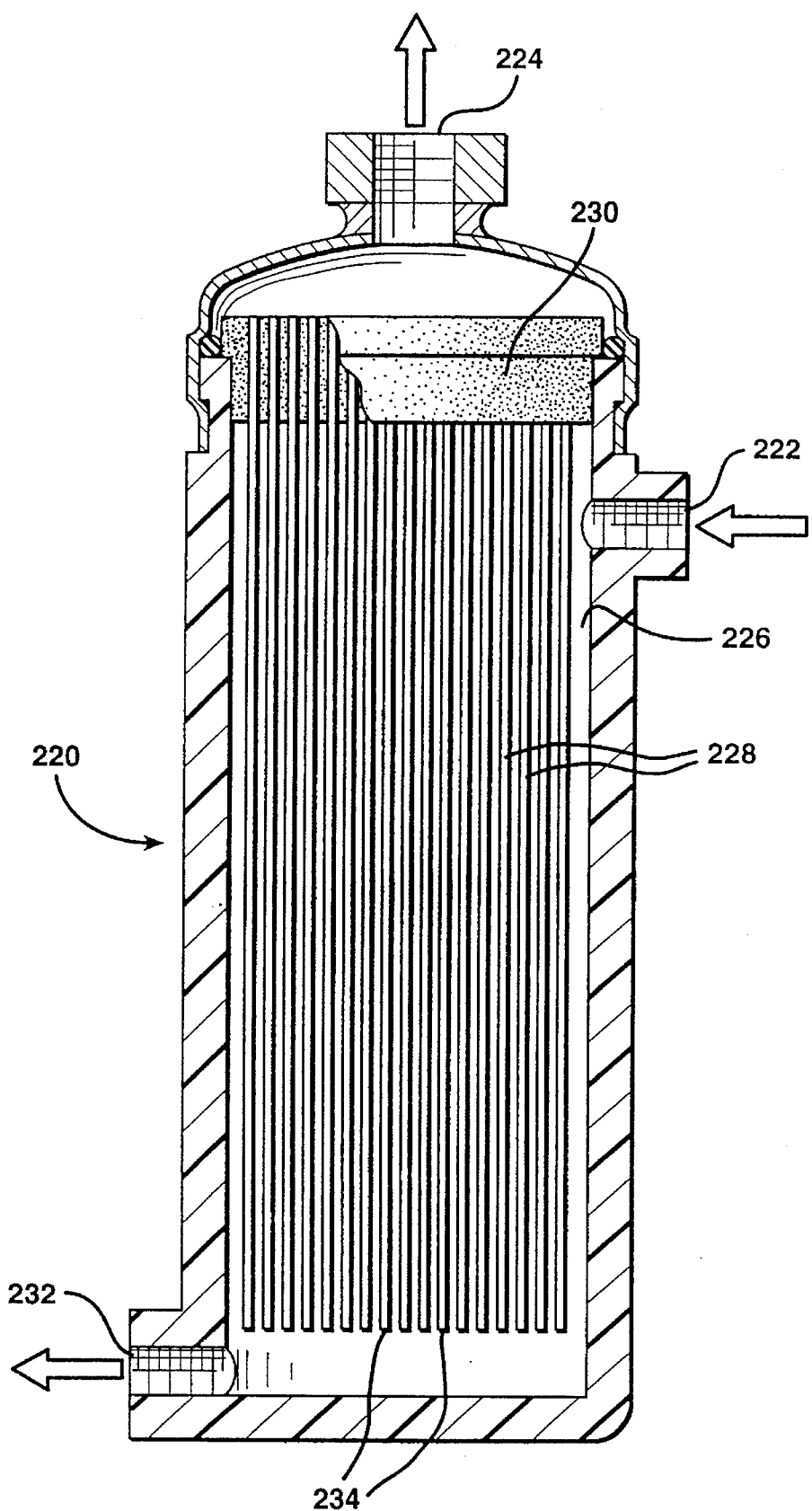
FIG. 5 is a side elevational view with a partial breakaway showing a module utilized in another embodiment of the present invention.

FIG. 5 depicts a module suitable for use when it is desired to reduce the content of a dissolved gas in a liquid such as beer. The contactor module 220 has an entry port 222 for the beer to enter under pressure. The beer remains on the shell side 226 of the fibers 228 and passes carbon dioxide through the fibers 228 via mass transfer into the bores of the fibers where the excess carbon dioxide exits the module 220 through the port 224. The fibers 228 pass through the tubesheet 230 so that the excess carbon dioxide in the bores proceeds to the exit port 224. The fibers 228 are sealed at the other end 234, for example by means of a hot wire cut. The beer, reduced in carbon dioxide content exits from the module at a port 232.

Figure 6:
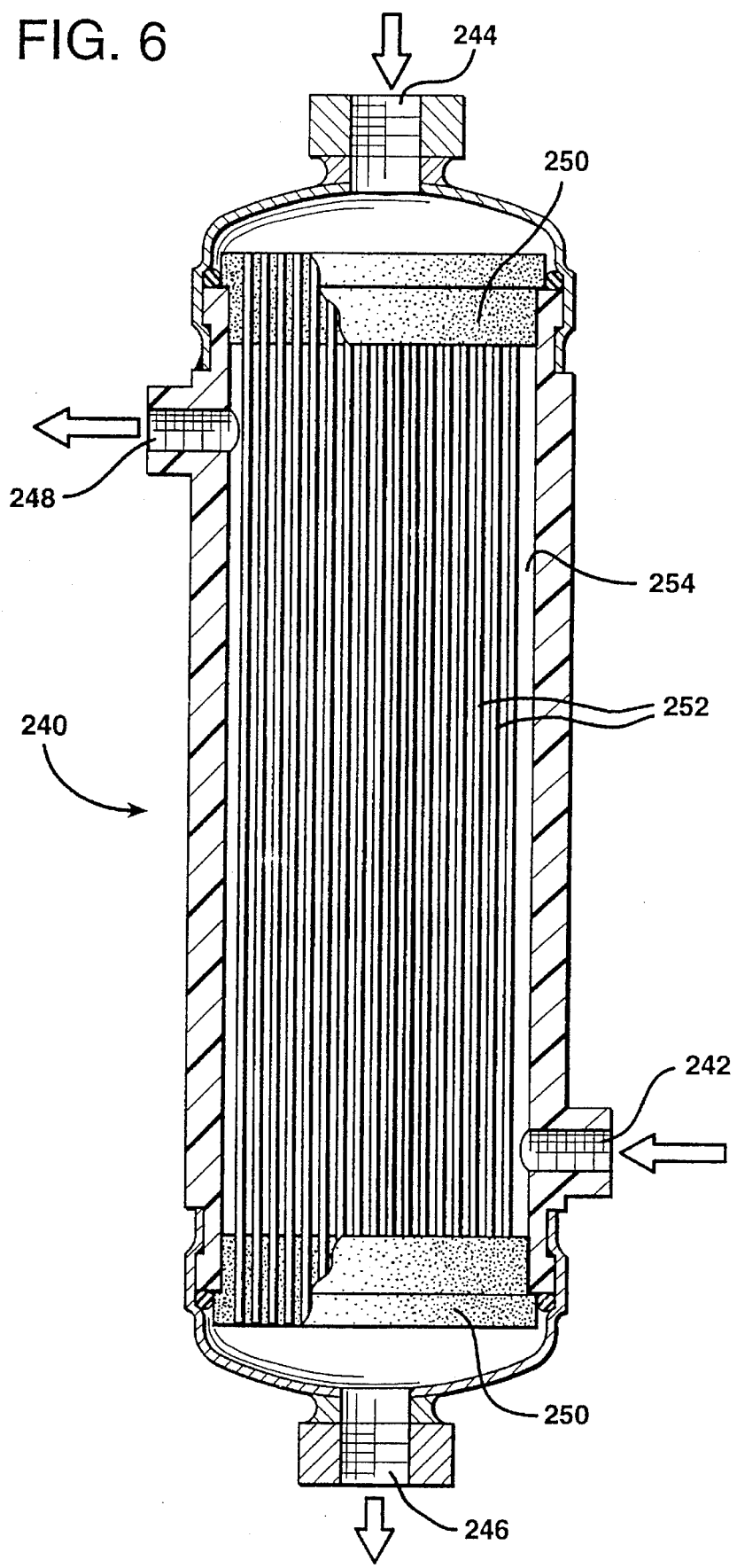
FIG. 6 is a side elevational view with a partial breakaway showing another module utilized in a further embodiment of the present invention.

FIG. 6 illustrates a contactor module 240 having an inlet 244 for a sweep gas e.g., nitrogen, which gas passes through the bores of the hollow fibers 252 and exits through an exit port 246. A beverage, e.g., beer, enters through a port 242 on the shell side 254 of the hollow fibers 252 under a predetermined pressure. The beer contains excess carbon dioxide which requires removal utilizing a sweep gas such as nitrogen. The module 240 has two tubesheets 250 which seal the ends of the module but gas can pass through the bores of the hollow fibers 252 because the hollow fibers extend through each of the tubesheets 250. The beer passes on the shell side 254 of the fibers and exits through an exit port 248. The module 240 is particularly suitable for use in the continuous flow mode.

The flexibility of the present invention allows either or both treatments of beer to take place easily and economically. Generally, when carbon dioxide is used as the pressure means to transport beer from the keg to the tap in the ordinary bar or restaurant, continuing carbonation of the beer takes place and frequently elevates the carbonation to an undesirable point. The present invention allows for treatment of that beer to reduce the carbonation content to a predetermined desirable point. The beer within two days exposure quite easily may reach 3.5 volumes of carbon dioxide per volume of beer when it is maintained under a carbon dioxide pressure of about 34 psi. It is desirable that certain ales have only a volume of 1.2 to 1.5 dissolved carbon dioxide per volume of beer. Other ordinary beers require about 2.2 to 2.5 volumes of carbon dioxide per volume of beer. The simple procedure of passing the beer through the hollow fiber membrane module depicted in FIG. 5, allows the carbon dioxide content to be reduced to the predetermined selected amount. The module operates quite simply and the regulation of the carbon dioxide content is easily achieved. It is necessary however to have a module for controlling the carbon dioxide content for each of the beer lines because the desired carbon dioxide content is different for different beers.

Nitrogenation of the beer is achieved utilizing the module depicted and described in FIG. 4. The beer flows into the shell side of the hollow fibers in the module and receives nitrogen under pressure which diffuses through the hollow fiber membrane surfaces into the beer. The nitrogen is dissolved in the beer and hence provides no bubbles while the beer is in the module or the line prior to dispense.

Figure 7:
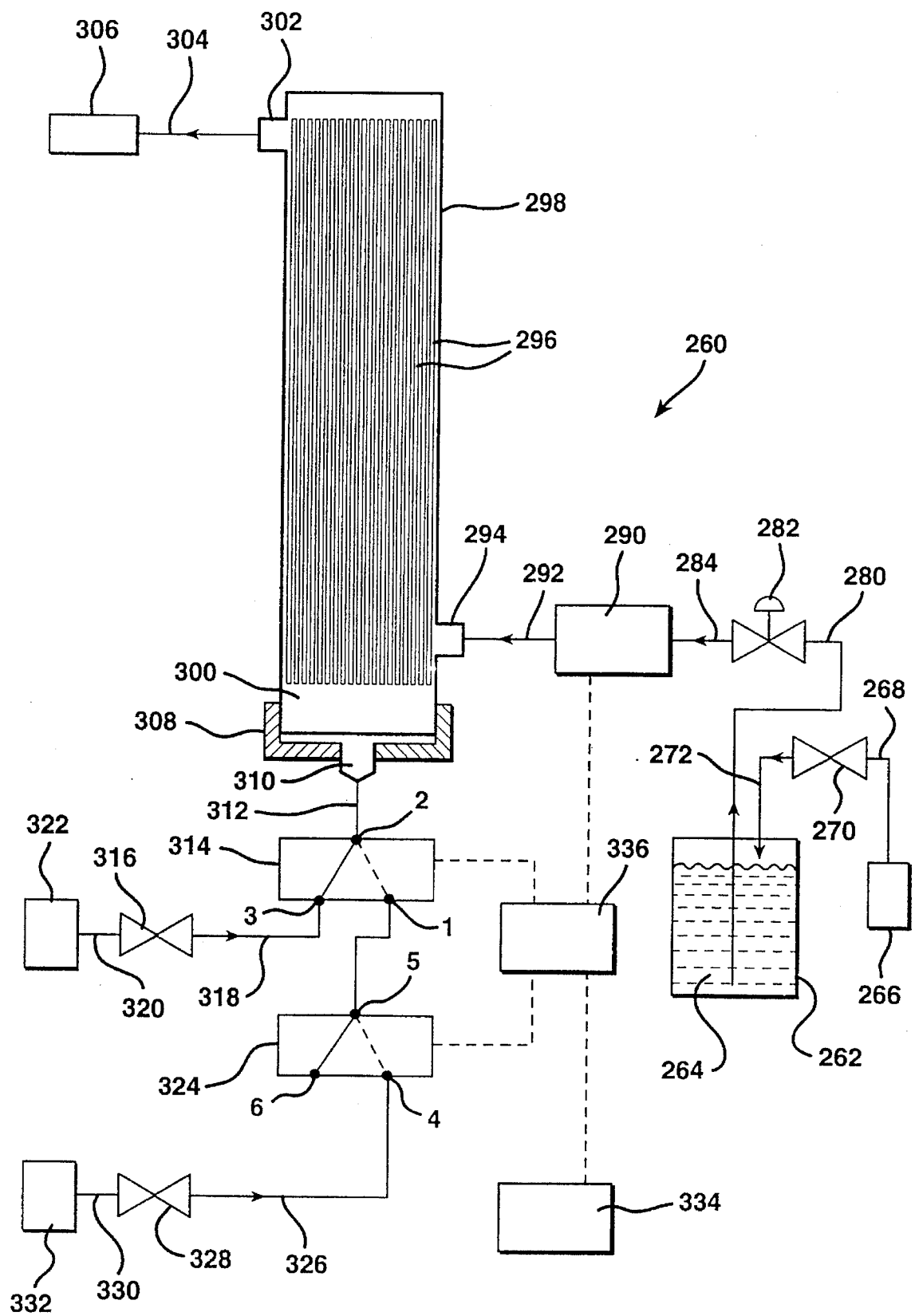
FIG. 7 is a schematic of a still further embodiment of the present invention.

A particularly desirable process 260 is depicted in FIG. 7. In this instance, a single contactor module 298 is used. The module 260 is substantially the same as that depicted in FIG. 4. A keg 262 of beer 264 is cooled and maintained under pressure of a gas (either carbon dioxide or nitrogen or a combination of carbon dioxide and nitrogen) supplied from a gas source 266 through a line 268 to a control valve 270 and hence through another line 272 into the head space of the keg 262. The gas pressure is maintained at a predetermined level sufficient to provide adequate flow of the beer 264 through a line 280. The beer 264 flows from the line 280 through a check valve 282 and through another line 284 to a flow switch 290. The flow switch 290 cooperates with the control unit 336 such that when the dispense system 306 is activated, the flow switch 290 allows beer to flow into the contactor module 298 through the line 292 into the shell side entry port 294. The shell side of the fibers 296 in the contactor module 298 remains full of beer at all times under pressure whether the dispense system is drawing beer or whether the beer is static or motionless in the module.

The hollow fibers 296 in the module 298 penetrate the tubesheet 300 into a port 310, through the capped end 308 of the module 298, wherein gas under pressure either leaves the bore side of the hollow fibers or is fed to the bore side of the fibers. A gas supply line 312 is connected to a three-port control valve 314. The valve 314 has three ports 1, 2 and 3. The port 3 receives nitrogen and the connection between port 3 and port 2 is opened and closed in response to the control unit 336. In a line 318 supplying nitrogen under pressure to the port 3, the nitrogen is maintained under a constant predetermined pressure controlled by the control valve 316. Nitrogen is supplied from a source 322 of nitrogen to the control valve 316 through a line 320. The connection between the hollow fiber bores and the port 2 is open at all times and receives gas from the connection from the port 3 or the connection from the port 1 or from the hollow fiber bores through the line 312 when gas is being discharged from the bore side of the fibers as will be explained later.

A second three-port control valve 324 has ports 4, 5 and 6. The port 5 of the valve 324 is connected by a line to the port 1 of the valve 314. Carbon dioxide is supplied from a source 332 under pressure through a line 330 to a pressure regulating valve 328, which is of the relieving type to a line 326. The carbon dioxide is maintained at a constant predetermined pressure in the line 326 controlled by the pressure regulating valve 328. When the flow switch 290 is closed, the beer in the contactor module 298 remains static and the connections to the ports 2 and 3 of the valve 314 are open to supply nitrogen under pressure through the bores of the hollow fibers so as to nitrogenate the beer in the manner discussed heretofore. When the dispense system activates and the flow switch 290 opens and beer flows out of the contactor module 298 through the exit port 302 and line 304 to the dispense system 306, the connection to the port 3 of the valve 314 closes and the connection to the port 1 opens simultaneously with the opening of the connections to the ports 5 and 6 to allow the excess nitrogen pressure to bleed from the fiber bores. The time required to reduce the bore pressure to substantially that of the atmosphere is dictated by the size of the internal passageways in the valve 314. The controls 336 are pre-set to allow that reduction in pressure before the operation of the valve 324 commences. This generally takes less than two seconds. Next the connection to the port 6 closes and the connection to the port 4 opens to allow the flow of carbon dioxide from the port 1 to the connection to the port 2 into the module 298. To complete the flow of carbon dioxide from the line 326 the connections to the ports 4 and 5 of the valve 324 open while the connections to the ports 1 and 2 of the valve 314 are open. The level of carbonation of the beer is controlled as discussed heretofore.

When the dispense system deactivates and the flow switch 290 closes, the connection to the port 4 of the valve 324 closes and the connection to the port 6 of the valve 324 opens to allow excess carbon dioxide to bleed from the bores of the hollow fibers 296 in the contactor module 298. After the pressure lowers to a predetermined level the connection to the port 1 closes and the connection to the port 3 of the valve 314 opens to again nitrogenate the static beer in the contactor module 298. Thus the beer is nitrogenated when it is in a static state in the contactor module and any desired carbonation takes place while the beer is being dispensed. By venting any of the residual carbon dioxide or nitrogen from the hollow fiber bores at the points of transition between the stopping and the starting of the flow of beer at dispense, development of a gradient of partial pressures of these gases along the length of the fibers is minimized or avoided. Power to the process is supplied by a power source 334 to the control unit 336 and any other points in the process 260 requiring power.

In the event that the carbon dioxide content of the beer reaching the contactor module 298 is too high, regulator valve 328 also operates to trim such over-carbonation. Carbon dioxide permeates from solution in the beer through the walls of the hollow fibers into the bore volume, and this excess carbon dioxide is vented at the relieving regulator valve 328 as it maintains the selected bore pressure in the module 298.

During dispense of beer from a keg, the proportion of gas in the head space to liquid changes. Thus as the beer level in the keg decreases so does the carbonation level of the beer. In the practice of the present invention, the dissolved carbon dioxide content of the beer remains substantially level so that the first glass drawn from the keg and the last will be carbonated to substantially the same degree. If nitrogen gas is used at 266 in FIG. 1 to displace a carbonated beer from a keg, the quantity of carbon dioxide in the head space of the keg will change during dispense of its contents. Thus the carbonation level of the beer will also be reduced, especially if the dispense pattern empties the keg slowly. This is delineated in FIG. 8, where a 50 liter keg of beer was dispensed evenly over a period of six days according to the scheme of FIG. 7, using nitrogen as the keg top pressure gas.

Nitrogenation of the beer and control of the carbonation of the beer occur substantially instantaneously. The contactor module ideally should hold more than about 25% up to about 75% of the volume of one typical beer dispense. In this manner, the nitrogenated beer is swept from the module on each dispense thereby preventing nitrogen gradients along the length of the hollow fibers.

Because nitrogen is about 60 times less soluble than carbon dioxide, it is found that the level of pre-dissolved nitrogen in a given type of beer is less critical to high quality dispense presentation than is the level of carbonation. For example, the nitrogenation level may vary by a factor of two or so, e.g., from about 30 ppm to about 60 ppm by weight without impairing presentation of the dispensed beer. Carbonation levels, however, should be maintained to within about 0.2 volume of the nominal level. Depending on the beer type, this nominal level will be set at a value between about 1.0 and about 2.5 carbon dioxide volumes per volume of beer. Control of carbonation in the present invention means either (1) the full addition of the required carbonation starting from zero or (2) incremental adjustment, up or down, to achieve the required nominal level. It should be noted that at all times until after dispense, the dissolved gases, nitrogen and carbon dioxide, are in bubble-less form and remain at the predetermined levels. Immediately, upon dispense, the carbon dioxide bubbles and the nitrogen bubbles form to provide a head on the beer.

It is generally agreed that high quality presentation in a beer drink means there is a distinct, white foam head formed on the surface when the drink is dispensed, and that this head should persist as long as possible. If the bubbles making up this foam are small, they also adhere in an attractive manner to the side of the glass while the drink is consumed. This is called "lacing".

As the beer is dispensed, nitrogen gas, which has a low solubility and which has been pre-dissolved in beer at elevated pressure, very rapidly precipitates out of solution in a very fine dispersion of small bubbles. Larger carbon dioxide bubbles also are precipitated at the same time. The very small nitrogen bubbles float more slowly to the beer's surface than the larger carbon dioxide bubbles. Some nitrogen bubbles also nucleate precipitation of dissolved carbon dioxide gas which enters them causing them to grow and float faster. The small bubbles which collect at the surface contain nitrogen and a mixture of carbon dioxide and nitrogen gases. Because nitrogen is less able to permeate through the bubble's walls due to its low solubility these bubbles are relatively stable. Although the bubbles are losing carbon dioxide by permeation to the atmosphere, that loss tends to be made up by further carbon dioxide arriving from the bulk of the beer in the glass. Therefore the "head" on a nitrogenated beer lasts longer and is more appealing to most customers.

In addition to securing consistent dispense quality the amount of nitrogen required is limited to the amount dissolved in the beer. For instance, if a bar or lounge were to dispense 10,000 gallons of beer with the amount of nitrogen being 50 ppm, the annual nitrogen usage utilizing the present invention would be less than 2 cubic meters compared with over 65 cubic meters of nitrogen if the same sales were made using a 50/50 mixed gas of nitrogen and carbon dioxide dispensing at 40 psig. Thus it can be seen that the present invention not only provides a more satisfactory product in the eyes of the customer but also conserves nitrogen.

It may be desirous to use nitrogen as the head pressure in a keg or vat to transport an initially flat beer to a contactor module to nitrogenate and/or carbonate the beer. Generally nitrogen is cheaper than carbon dioxide and brewers find flat beers easier to handle than fully carbonated beers. During the dwell time of the beer, typically three days under the pressure of nitrogen in the keg, little or no nitrogen is dissolved in the beer. In order for significant dissolution of the nitrogen into the beer to take place, the contact interface area needs to be large and the partial pressure of the gas in relation to the partial pressure of the same gas already dissolved in the liquid needs to be increased.

A top pressure of a mixed nitrogen/carbon dioxide gas alternatively can be used to dispense keg beers. The carbon dioxide partial pressure is set to a predetermined level and nitrogen makes up the remainder pressure needed to transport the beer. In this manner there is substantially no net change in the level of carbonation of the beer. However, there can be no appreciable dissolution of nitrogen into the beer so unless the beer is already nitrogenated by the brewery, use of the present invention is necessary to achieve the desired level of nitrogenation for satisfactory presentation of the beer. Furthermore, as the beer in the keg is dispensed, the carbonation level of the beer decreases to come into equilibrium with the carbon dioxide level in the head space in the keg. However, when using the present invention, the carbonation level of the beer is substantially even. (See FIG. 8)

Some brewers now nitrogenate certain of their beer products. These most generally are dispensed with a nitrogen/carbon dioxide mixed gas as the keg top pressure gas. But the ratio of nitrogen to carbon dioxide gases and the pressure used are still calculated to provide the correct carbon dioxide "balance" pressure and thus, without the present invention, the system does not have the degree of freedom to also provide a target nitrogen "balance" pressure which may correspond to a dissolved nitrogen concentration of between 15 and 60 ppm by weight. The role of dissolved nitrogen is to produce a tighter and more stable foam (head) on dispense, as has been explained.

Figure 9:
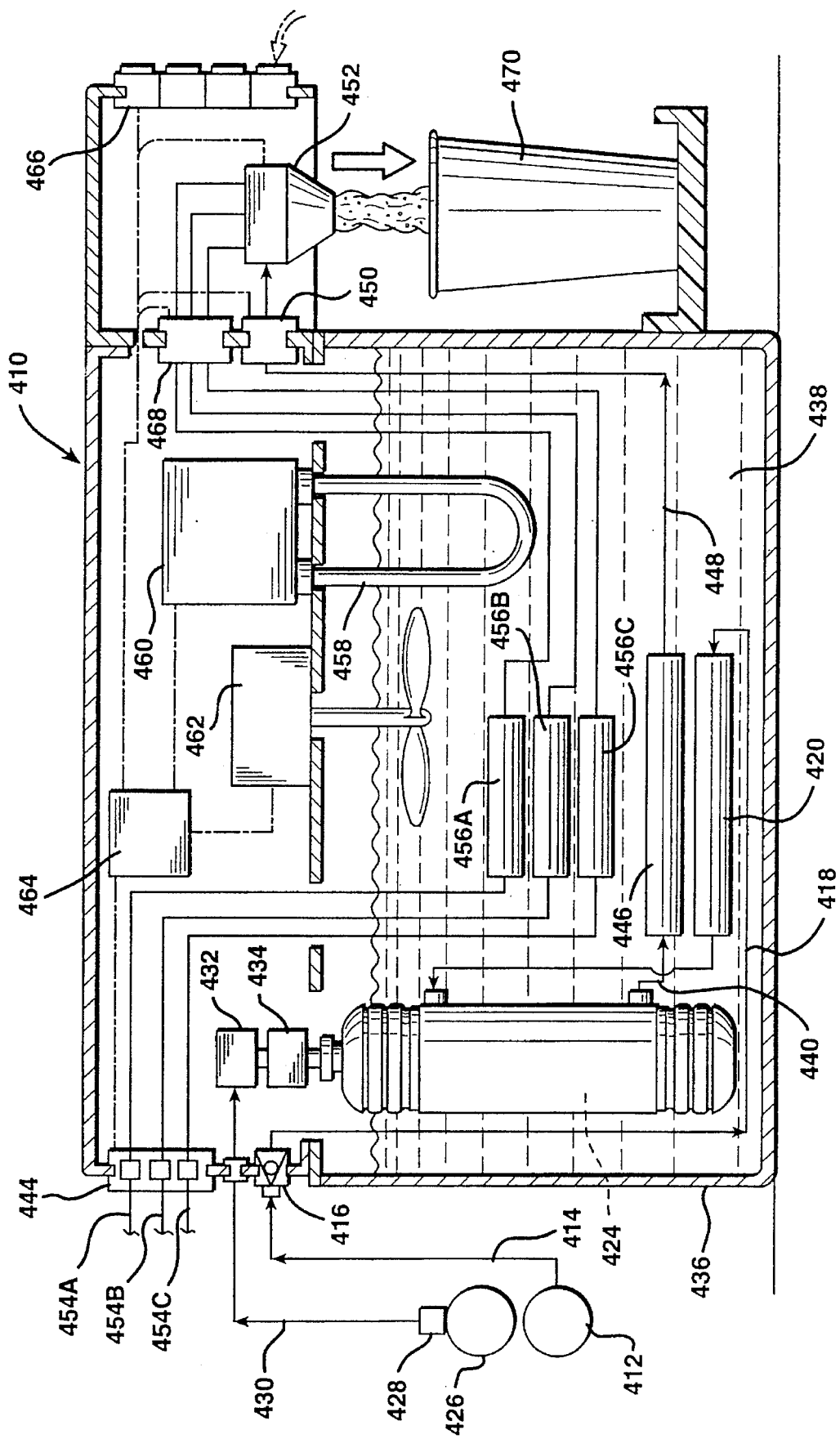
FIG. 9 is a schematic illustration of one embodiment of the process of the present invention.

FIG. 9 depicts one embodiment in schematic form of the process of the present invention for the carbonation of water. The dispense system 410 is provided with a water source 412. The water is under a pressure of at least 20 psi and is transferred through a water line 414 to a check valve 416. The check valve 416 is closed until a demand is made on the system for carbonated water. The water, after it has passed the check valve 416, flows through a water line 418, to a pre-cooler 420, which reduces the ambient temperature of the water to a temperature in the range of about 0° to about 10° C., preferably from about 0° C. to about 4° C. The water from the pre-cooler 420 then enters the shell side of the module 424 where the water receives carbon dioxide from a carbon dioxide supply 426. The carbon dioxide flows from its source 426, through a primary pressure regulator 428, and then through a line 430, to the bore side of the hollow fibers in the module 424. It is preferred that the pressure of the carbon dioxide remain substantially constant. The carbonated water exits the module 424 through a line 440, to a carbonated water cooler line 446. The carbonated water is then transferred through a line 448, to the soda dispense valve 450. The soda dispense valve 450 acts in concert with the syrup dispense valve 468 and discharges the soda and syrup into the soda/syrup mixing chamber 452 where the soda and syrup are mixed before emptying into the beverage glass 470.

A control box 464 controls each of the valves as well as the temperature controls. For instance, the control box 464 notifies the syrup dispense control 444 when to dispense syrup from syrup sources 454A, 454B, and 454C. Each of the syrups proceeds to its corresponding syrup pre-cooler 456A, 456B, and 456C. The syrup is then delivered from the pre-cooler 456A, 456B, or 456C, to the syrup dispense valve 468. The syrup and carbonator systems are activated by a request from the drink selection panel 466. In this system, the cooling takes place in an icebank 436, which is partially filled with icy water 438. The syrup and soda lines 448 and 456 and pre-coolers 420 and 446 are immersed in the icy water 438 along with the module 424. A refrigeration unit 460 controls the temperature in the icebank and chills the icebank through a refrigeration coil 458. The ice and water in the icebank 436 are stirred by an icebank stirrer 462.

Figure 10:
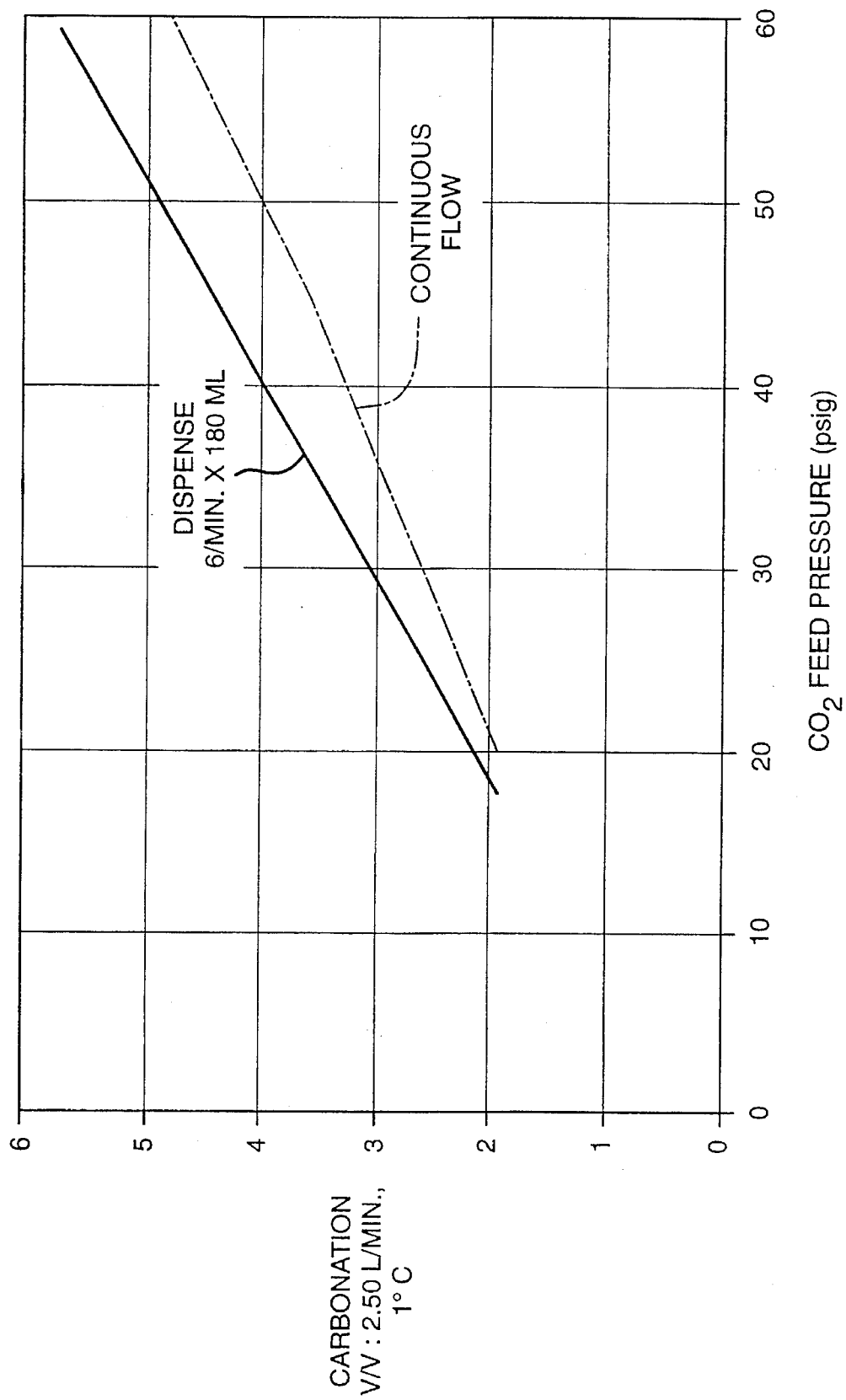
FIG. 10 is a graph depicting carbonation data for a module for continuous flow compared to interrupted dispense flow to a soda dispense station.

FIG. 10 illustrates the surprising difference between carbonation, which can be attained on a continuous flow basis in comparison to that which is obtained when the system is in the dispense mode.

The dispense mode for the present invention is controlled by the opening and closing of the dispense valve in concert with the check valve, which starts and stops the flow of water into the carbonation module. FIG. 10 illustrates the carbonation level attained in a module when the carbonated soda is in continuous flow and it also illustrates the carbonation attained when the system is in an intermittent dispense mode where 180 milliliter quantities of carbonated water are dispensed 6 times each minute. The flow rate of the carbonated water is 2.5 liters per minute, and the temperature is at 1° C. It is seen from FIG. 10 that the carbonation of the water is controlled by the carbon dioxide feed pressure. For instance, when the carbon dioxide feed pressure is at 50 psig, carbonation of water in a continuous flow mode produces 4.0 volumes of carbon dioxide for each volume of water. When in the dispense mode, 50 psig of carbon dioxide produces a carbonation volume of about 4.85.

When the required volume of drink has been dispensed and the flow of soda is stopped by the dispense valve, the rapid destruction of the liquid's momentum causes a pressure pulse to be reflected back through the soda lines and the shell volume of the module as far as the check valve. The check valve closes almost instantaneously, isolating the downstream volume of liquid from the feed water supply. At this instant the hydraulic pressure in this isolated downstream volume (termed here as the "snap" pressure) is very much greater than during dispense flow, provided that no bubbles of carbon dioxide gas are contained in this volume.

Figure 11:
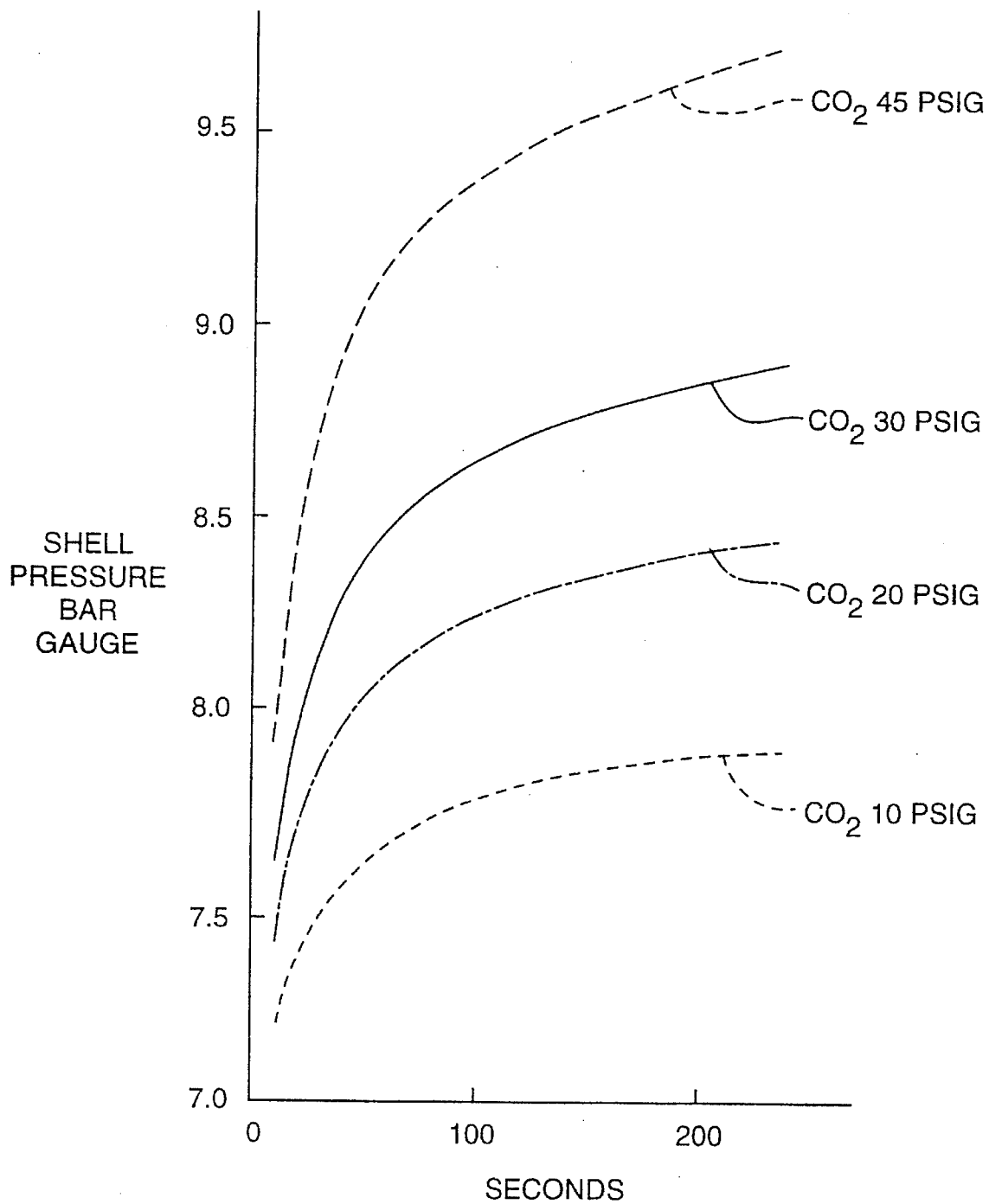
FIG. 11 compares the shell pressures reached using different bore pressures of carbon dioxide in two embodiments of the present invention.
Figure 12:
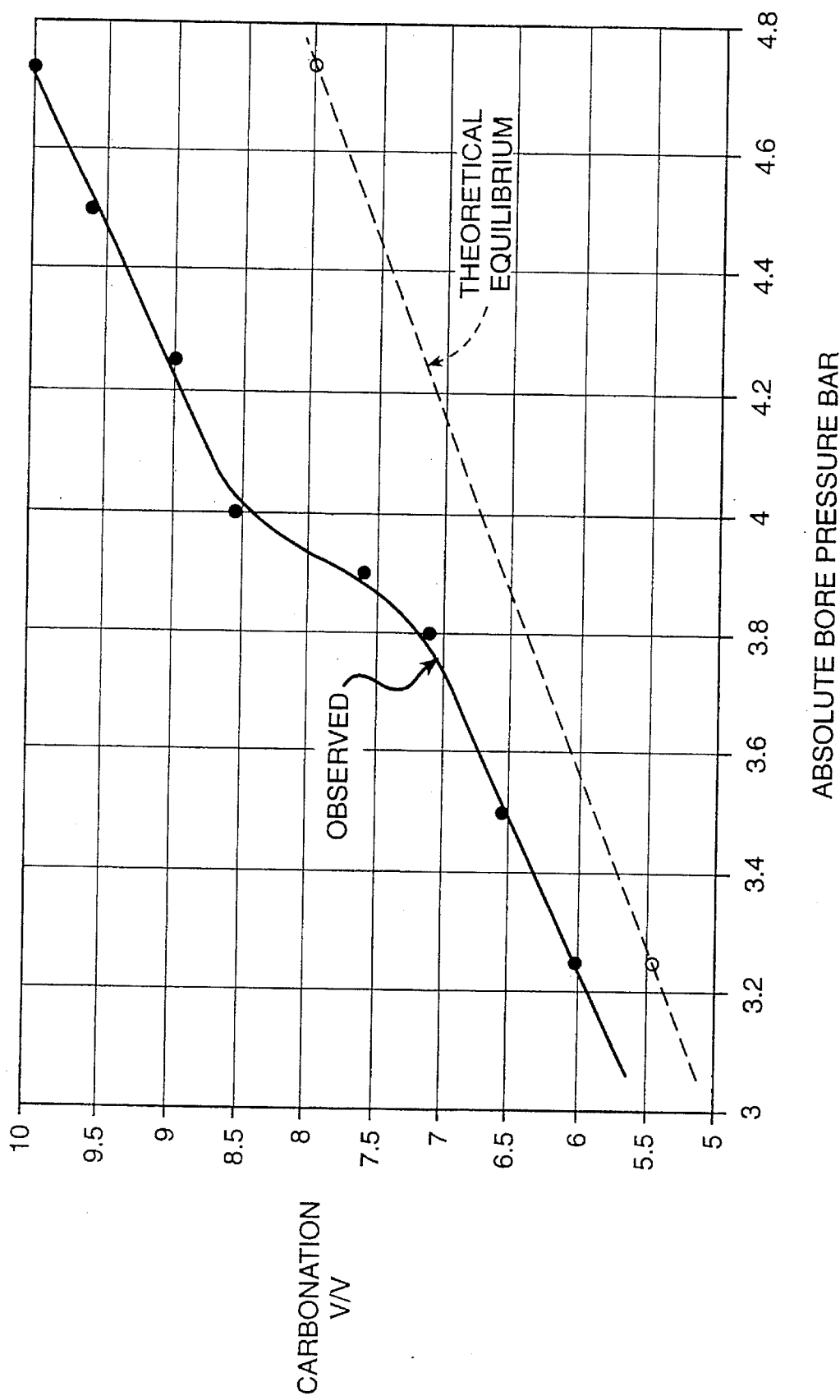
FIG. 12 is a graph illustrating carbonation of water compared to the theoretical values of carbonation.

FIG. 11 illustrates that following the moment of shut-off and the creation of snap pressure, carbonation of water within the module continues to take place, where the further increases in shell pressure result from expansion of soda as more carbon dioxide is absorbed by the water. It is indeed surprising that the level of carbonation thus produced is significantly greater than the levels predicted for the applied bore pressure as given in the published equilibrium data for a carbon dioxide/water system. FIG. 12 depicts this phenomenon, which is observed for all modules operated in the "check valve" configuration. This enhancement of carbonation is directly responsible for the results shown in FIG. 10, where typical intermittent dispense carbonation is at a higher level than in the continuous flow carbonation process.

FIG. 11 shows the rapid increase in shell pressure following the 'snap' effect that occurs as a result of continued carbonation following termination of a dispense action, the level of carbonation produced being contingent on the corresponding applied bore pressure of carbon dioxide. However, it is surprising that in FIG. 11, significantly increased shell pressure occurs at approximately 40 psig carbon dioxide pressure. This corresponds with the dramatic increase in carbonation measured at and above 40 psig illustrated in FIG. 12. The snap pressure effect and the resultant enhancement in carbonation are because of the action of the check valve. This configuration therefore enables use of a smaller, more compact module than would be predicted from data for continuous flow operation of the module.

Figure 13:
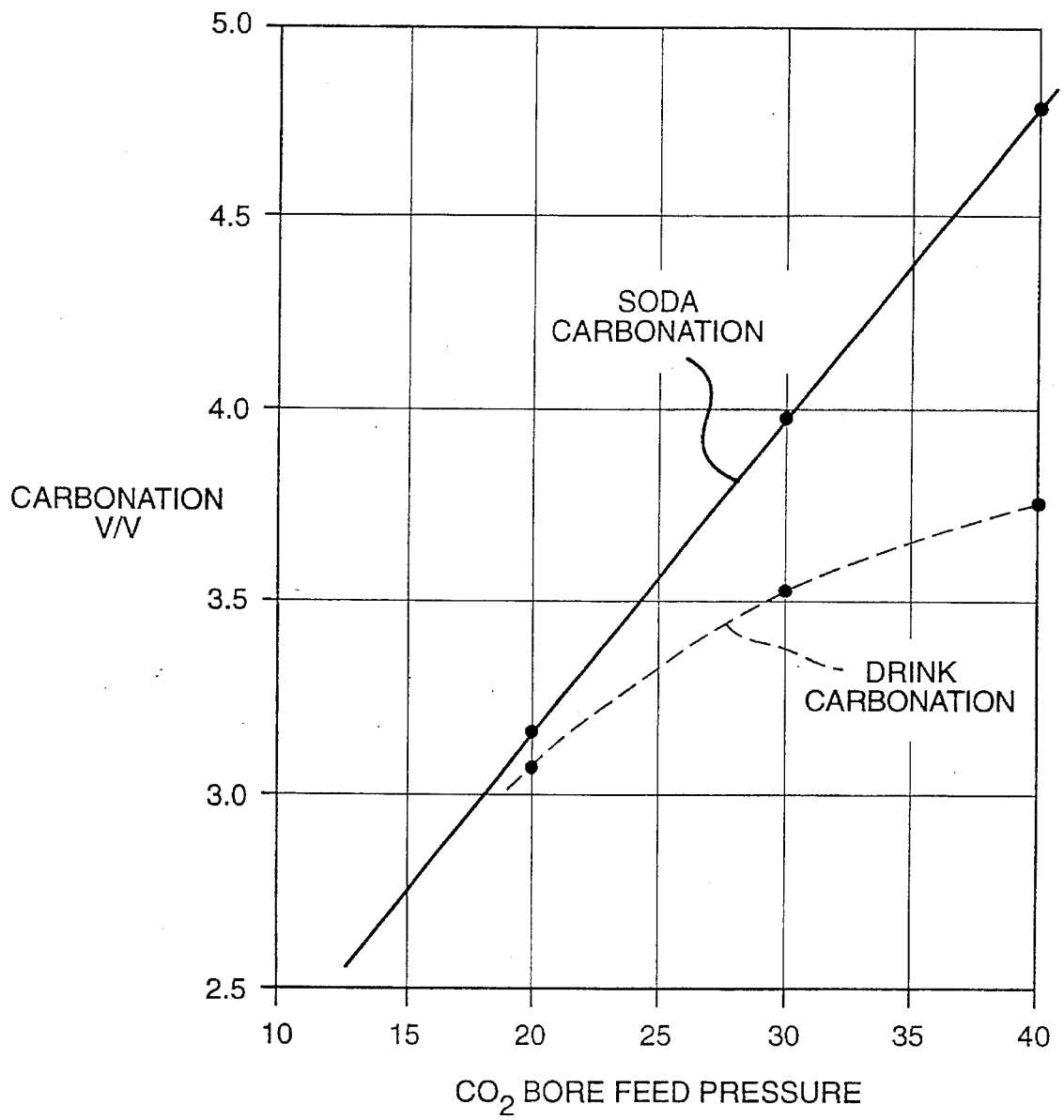
FIG. 13 illustrates carbonation of water used as soda and in drinks utilizing one embodiment of the present invention.

FIG. 13 compares the carbonation level of soda with that of the Post Mix drink. The difference between the two curves is the result of gas loss as the soda flows through the final dispense valve and into the glass. This FIG. 13 illustrates that satisfactory drink carbonation levels can be obtained using the module to produce soda carbonation levels below 5 volumes of carbon dioxide for each volume of water.

Conventional carbonators are designed to produce higher soda carbonation levels.

As a result of the ability of the modules utilized in this invention to operate satisfactorily at lower carbon dioxide pressures and lower soda carbonation levels, the modules effect considerable savings in carbon dioxide usage for Post Mix beverage dispensing.

The target soda carbonation from the module for Post Mix dispense application need not be greater than 6 v/v at a temperature of 1° C. The connections to, and control of, the module are very simple in practice. The shell volume has two ports, an inlet for water, and an outlet for soda, one at each end of the module to ensure that all active fiber surfaces are exposed to liquid flow. The fiber bores communicate with a third end port and this is connected to a pressure regulator fed with carbon dioxide gas.

The fibers used in the module are characterized by a reasonable degree of permeability for carbon dioxide in bubble-less mass transfer. The hollow fiber membranes have an average pore size less than about 500 Angstroms as estimated by Knudsen's flow equation and a surface having less than 0.1% holes. The membranes are non-floodable and have a P/I for carbon dioxide greater than about $50 \times 10^{-6}$ to about $5,000 \times 10^{-6}$ cm$^3$/cm$^2$·sec·cmHg, and the module has at least about 25 sq cm of membrane surface per ml of liquid volume for a liquid flow rate of about 2 liters/minute.

With continuous liquid flow operation at a given bore pressure, liquid flow rate and temperature, the mass transfer of carbon dioxide from the fiber bores into the liquid is then effectively limited by the resistance to diffusion of dissolved carbon dioxide through the nearly saturated liquid boundary layer surrounding each fiber as well as by the resistance in the fiber wall itself. The disposition of the shell side ports in relation to the bundle of hollow fibers is important in ensuring that there are substantially no regions where there is poor or stagnant flow of liquid past exposed fiber surfaces. Surprisingly, it has been found that the performance of a given module expressed as the level of carbonation produced in the soda exiting the module, is actually enhanced through the utilization of the check valve in intermittent on/off operation which is the operating mode characteristic of the Post Mix dispense system. FIG. 10 illustrates the typical difference between the intermittent dispense mode operation and continuous flow operation.

It is theorized that part of the enhanced performance in intermittent on/off operation, is due to a transient, but repeatable reduction in thickness of the liquid boundary layers surrounding the hollow fibers as the flow of incompressible liquid through the module starts very rapidly from zero to full flow at the beginning of a dispense event. At the beginning and during a dispense event, both water and carbon dioxide enter the module. The total duration of soda flow during a drink dispense is normally no longer than 4–5 seconds. In practice, even the 4–5 seconds is often deliberately interrupted. At the end of the dispense event, there is some continuing carbonation through the boundary liquid layer around each fiber where its concentration builds toward an equilibrium which is greater than the saturation level expected for the applied bore pressure. The next dispense event effectively scrubs the boundary layer and the processes repeat. This is substantially true for other beverages such as beer and wine.

Although during carbonation, there are certainly carbonation concentration gradients within the shell both radially from any given fiber and longitudinally along the module, the entire shell volume is at an almost uniform pressure. If the carbonation in any local region of the shell exceeds a value for which the corresponding carbon dioxide vapor pressure is above the shell's actual hydraulic pressure then that region is super saturated and there will be a tendency to form free gas bubbles. This does not apply to the no-flow condition, i.e., the condition between dispense events, because then the shell volume is fixed, and there is no possibility of bubbles forming.

An increasing differential and thus higher carbonation values for a given water feed pressure, can be achieved by decreasing the resistance to mass transfer through the liquid boundary layer. This can be accomplished by using a higher length/diameter aspect ratio for a given soda flow rate to increase the average fluid velocity. Alternatively, one might obtain the same improvements by employing different fiber geometry, e.g., by winding the fibers in a helical pattern to increase the nature of cross flow in the shell volume.

Another advantage achieved when using in-line membrane module carbonators, is that for a given water feed pressure, it allows extension to higher applied carbon dioxide pressures before the carbon dioxide bubble break-out limit is reached. This potentially would permit operation at low water feed pressures without the need for a water feed pump. Generally when using a check valve in a line of liquid flow, the primary impact is observed in the upstream flow. In the present instance, the impact found most desirable and helpful is on the downstream flow of the liquid. It may be desirable to control the water pressure upstream of the check valve to be sure that a minimal water pressure is reached. Ordinarily, the pressure in a tap water line is adequate, however, depending on the route of pipes and the type of pipes leading to the point at which the carbonator system is connected may require that additional pressure be made available. This pressure can be provided by a water pump.

As stated earlier, conventional carbonators utilize high pressure water pumps. The high pressure performance of these pumps is needed in order to create the finely-divided spray which provides for a high surface area of contact with carbon dioxide gas in production of soda.

In the case of the membrane carbonator module, this contact surface area is provided naturally and without consumption of power, by the fibers themselves. Thus there is no need for a high pressure water pump for this purpose, and a water pump is only required in instances where the local supply pressure is insufficient to prevent breakout at the required carbon dioxide feed pressure needed for the target carbonation level.

For Post Mix dispensing of flavored carbonated beverages, it is important that the flow rate of soda is fixed in order to maintain the required ratio of syrup to soda in the drink. In the case of conventional carbonation, the hydraulic feed pressure of soda from the carbonator tank is equal to the applied pressure of carbon dioxide. Soda dispense valves generally incorporate flow control mechanisms based on spring-adjustable variable-area orifices. These can also be used with the membrane module carbonators provided that the hydraulic feed pressure of soda at the module (i.e., effectively equal to the feed water pressure applied to the module) is within the control range of the dispense valve's flow control mechanism. Where this condition cannot be met, e.g., where the feed water pressure fluctuates, an alternative means for controlling the flow rate of soda is to use a regulator to set the pressure of feed water applied to the module and to use only a fixed orifice in the soda dispense valve. In cases where the beverage dispense system has a single carbonator feeding more than one beverage tap, these taps are connected via a soda manifold.

A particular advantage of having a check valve in the water supply prior to its entering the shell side of the module, is that a higher bore pressure of carbon dioxide can be used without break-out. For instance, if the shell pressure is 38 psig during a four-second dispense period, the maximum bore pressure could be raised to 75 psig with a check valve present, compared to 53 psig in a system which does not have a check valve. This demonstrates the capability of the check valve to control the system down stream of the check valve.

It is generally preferred to operate the module with an applied bore pressure which is greater than that of the shell pressure during dispense flow (but not greater than the limit at which gas break-out occurs). During the time when not dispensing, the presence of the check valve will give rise to a shell pressure, the "snap" pressure, which is higher than the bore pressure, as explained earlier. However, the capillary pressures acting to fill and retain liquid in the very small pores in the fiber wall are large compared to the module's bore and shell operating pressures. Hence, there is found to be no transfer of liquid into the bores of the fibers within the suggested values of fiber specifications.

The presence of any defects in the seal which separates the module's bore plenum from its shell volume is a potential route for water to enter the bore plenum and then to penetrate and flood the fiber bores. A further preferred embodiment of the present invention includes a pressure-equalizing valve which prevents the shell pressure from exceeding that of the carbon dioxide feed gas. Such a valve serves as a relief valve to prevent over pressurization of the shell, and additionally can be adapted to include a relief valve for the carbon dioxide feed.

It is to be noted that, in practice, the action of this valve does not affect the ability of the module to produce the enhanced carbonation effect which was discussed earlier (the data shown in FIG. 12 are measured with this valve in place). This is because the operating bore pressure, and hence the shell "snap" pressure, is generally set at above 40 psig.

Since the soda volume downstream of the check valve is essentially incompressible, the valve will eject only a very small discharge of liquid at the end of each dispense. The valve may be located above the icebank's water level.

The entire process of the present invention is bubble-less throughout until the liquid is dispensed. This is accomplished by using the process of the present invention and by utilizing hollow fiber membranes, which have certain characteristics, in the contactor modules. The membranes must be non-floodable under the pressure conditions of use. Since there is liquid on one side of the membrane and gas on the other, it is necessary that the liquid not flood the bores of the fibers. Also the membranes should have the characteristics heretofore discussed and have satisfactory permeability for each of carbon dioxide and nitrogen so as to permit useful rates of mass transfer of the gas to the liquid.

The permeability of a given gas is the volume of gas at standard temperature and pressure, which passes through a membrane per square centimeter of surface area, per second, for a partial pressure drop of 1 centimeter of mercury (cmHg) across the membrane per unit of thickness, and is expressed as $P/l=cm^3/cm^2 \cdot sec \cdot cmHg$. The suggested range of P/l for carbon dioxide at 20° C. in a dry state for membranes used in the present invention is from about $50 \times 10^{-6}$ to about $5,000 \times 10^{-6}$ $cm^3/cm^2 \cdot sec \cdot cmHg$ or more. A preferred range is from about $150 \times 10^{-6}$ to about $3,000 \times 10^{-6}$ $cm^3/cm^2 \cdot sec \cdot cmHg$ and the most preferred range is from about $300 \times 10^{-6}$ to about $1,000 \times 10^{-6}$ $cm^3/cm^2 \cdot sec \cdot cmHg$. In addition, the hollow fiber membranes have an average pore size less than 500 Angstroms and a surface with less than 0.1% holes, the membranes being non-floodable and having a P/l for carbon dioxide greater than about $50 \times 10^{-6}$ to about $5,000 \times 10^{-6}$ $cm^3/cm^2 \cdot sec \cdot cmHg$. These fibers allow permeation of nitrogen as well and are satisfactory for use in the present invention.

It is suggested that the fibers be made from hydrophobic polymers. The polymeric membrane material is selected from substituted or unsubstituted polysulfone, polystyrene, acrylonitrile-styrene copolymer, styrene-butadiene copolymer, styrene-vinylbenzylhalide copolymer, polycarbonate, cellulose acetate, cellulose propionate, ethyl cellulose, methyl cellulose, nitrocellulose, polyamide, polyimide, aryl polyamide, aryl polyimide, polyether, polyetherimide, polyarylene oxide, polyphenylene oxide, polyxylylene oxide, polyesteramide-diisocyanate, polyurethane, polyester, polyarylate, polyethylene terephthalate, polyalkyl methacrylate, polyalkyl acrylate, polyphenylene terephthalate, polysulfide, polysiloxane, polyethylene, polypropylene, polybutene-1, poly-4-methyl pentene-1, polyvinyl chloride, polyvinyl fluoride, polyvinylidene chloride, polyvinylidene fluoride, polyvinyl alcohol, polyvinyl acetate, polyvinyl propionate, polyvinyl pyridine, polyvinyl pyrrolidone, polyvinyl ether, polyvinyl ketone, polyvinyl aldehyde, polyvinyl formal, polyvinyl butyral, polyvinyl amine, polyvinyl phosphate, polyvinyl sulfate, polyacetal, polyallyl, polybenzobenzimidazole, polyhydrazide, polyoxadiazole, polytriazole, polybenzimidazole, polycarbodiimide, polyphosphazine, polypropylene oxide, and interpolymers, block interpolymers, copolymers, block copolymers, grafts and blends of the foregoing as well as other suitable materials.

EXAMPLE 1

Using the process depicted in FIG. 2, a keg of beer containing an ale type beer with an initial carbonation level of 1.0 carbon dioxide volume per volume of beer, is connected to a carbon dioxide top pressure gas source at 28 psig. After 48 hours at 12° C., the carbonation level has increased to 2.9 v/v. A series of sample drinks, each with a volume of about 0.5 liter, are dispensed into clean glasses at a flow rate of 2 liters per minute. Both contactor modules contain membranes of polysulfone as heretofore described and are cooled by an external close fitting coil containing circulated cold water at about 4° C. The pressure setting of the carbon dioxide relief valve (# 70 FIG. 2) is at 5 psig resulting in a beer product having a carbon dioxide content of about 1.4 v/v. The nitrogen feed pressure for the second module (# 86 FIG. 2) is set at 35 psig resulting in a beer having a dissolved nitrogen content of about 40 ppm.

The drink samples are dispensed without breakout of bubbles in the delivery line upstream of the tap and without excessive foaming in the glass. At the time of dispense, a flow meter is attached to the outlet port of the relief valve (# 70 FIG. 2) which registers a flow of carbon dioxide gas as soon as the dispense tap is open, and the flow rapidly falls to zero upon closing of the dispense tap thus clearly signifying the removal of carbon dioxide from the ale. The head on the dispensed beer samples is a consistent white foam, approximately 0.5 inch thick, made up of small bubbles, which remain stable for 120 minutes with minimal reduction in its thickness.

EXAMPLE 2

Using the same beer described in Example 1, after it has been carbonated upon standing for 48 hours at 28 psig carbon dioxide pressure and 12° C., samples are dispensed via a tube connected directly to the dispense tap by-passing the membrane contactor modules. It is not possible to dispense the 0.5 liter samples without considerable waste due to excessive foaming in the glass. The head on the samples is less white in appearance than those in Example 1, and are made up of individual bubbles with a wide range of sizes, generally, much larger than those observed in Example 1. The heads, initially of equivalent thickness to those of Example 1, are also found to decay rapidly on standing. The dispensed beer's liquid layer is exposed after only 8 minutes.

EXAMPLE 3

A lager beer with an initial carbonation of 2.4 v/v is connected to the same contactor module scheme as in Example 1, with a keg top pressure of 32 psig for 48 hours before dispensing drinks through the tap. The pressure of the relief valve is set at 15 psig and the nitrogen pressure is set at 30 psig. Samples are easily dispensed without excessive foaming. The head on the dispensed samples, about 0.5 liters each, is initially similar in appearance to those produced in Example 1. The foam is stable for a period of at least 35 minutes.

EXAMPLE 4

The lager beer used in Example 3 is dispensed directly by-passing the membrane contactor modules. The samples are dispensed with more foaming in the glass than in Example 3, and the heads are less white in appearance and are found to decay rapidly. The liquid surface is exposed in less than 5 minutes.

It is readily apparent that the process of the present invention for the treatment of beer accomplishes (1) a maximum total head pressure on the keg in order to provide fast dispense flow rates; (2) the correct partial pressure of carbon dioxide in the beer to avoid over carbonation; and (3) the correct nitrogen partial pressure in the beer to provide nitrogenation and hence a stable head on the beer.

EXAMPLE 5

When practicing the process of FIG. 7, the nitrogen gas is regulated at a pressure from about 20 to about 40 psi. The nitrogen partial pressure determines the ultimate concentration of nitrogen dissolved in the beer. The process of nitrogenation is about 50% completed in about 17 or 18 seconds and about 80% completed in about 40 seconds.

Figure 8:
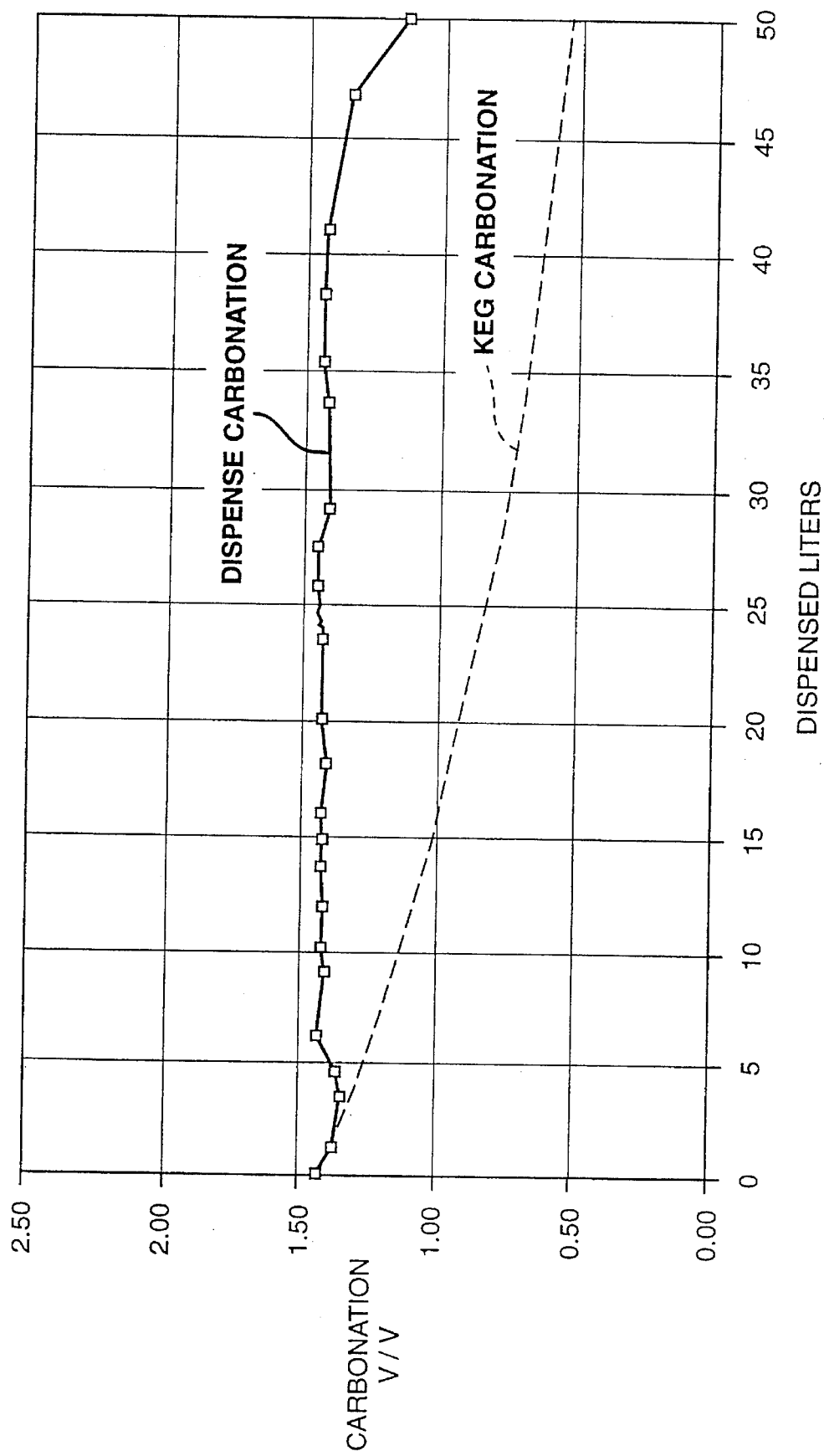
FIG. 8 is a graph depicting the carbonation level of the beer as the keg empties.

A keg of proprietary ale type beer is cooled to 12.5° C. and provided with a nominal 35 psig nitrogen top pressure. The beer is then transported to the apparatus shown in FIG. 7 and treated according to the procedure disclosed above for using this apparatus. The valve 316 provides a pressure of nitrogen of 35 psig and the valve 328 provides a pressure of carbon dioxide of 6 psig. The beer is carbonated to a level of about 1.4 v/v. In FIG. 8, the results are shown for having drawn off beer over a six day period until the keg is substantially empty. It is clear that the present invention allows the beer to retain its proper carbonation during substantially the entire time the keg is being emptied. The dotted line in the graph depicts the usual degradation of the carbonation of the beer over the same time period, i.e., about six days for emptying.

EXAMPLE 6

Modules are prepared in accordance with FIG. 4 containing polysulfone hollow fibers having the heretofore discussed characteristics and a P/I for carbon dioxide of at least $150 \times 10^{-6}$ cm$^3$/cm$^2$·sec·cmHg for carbon dioxide. Water is placed in the shell side of the membranes and carbon dioxide in the bores of the membranes at the pressures shown in the table below. The water is maintained at a temperature of 1°–3° C. Each of the modules contains about 15 square feet of active membrane surface. The flow of soda is about 2 liters/minute when a drink is dispensed. Drinks containing about 200 ml of soda and syrup combined can be dispensed up to about 10 times per minute, but usually in commercial practice would not average much more than about 3 times per minute. In these examples the drinks are dispensed about every 20 seconds. Testing reveals that dispensing as many as 10 drinks/minute does not diminish the carbon dioxide content of the soda being dispensed.

TABLE 1

| Module No. | Shell Water Pressure psig | P/I × 10$^{-6}$ | Carbon dioxide Pressure psig | Soda CO$_2$/H$_2$O volume/volume | Drink CO$_2$/H$_2$O volume/volume |
|---|---|---|---|---|---|
| 1 | 53 | 420 | 50 | 5.4 | — |
|   | 53 | 420 | 60 | 6.2 | — |
|   | 53 | 420 | 64 | 6.4 | — |
|   | 53 | 420 | 68 | 6.75 | — |
|   | 53 | 420 | 72 | 6.85 | — |
|   | 53 | 420 | 90 | 8.25 | — |
| 2 | 53 | 420 | 69 | 7.8 | — |
| 3 | 53 | 510 | 69 | 8.2 | — |
| 4 | 53 | 370 | 69 | 7.3 | — |
| 5 | 53 | 340 | 69 | 6.6 | — |
| 6 | 53 | 188 | 69 | 5.3 | — |
| 7 | 53 | 189 | 69 | 5.7 | — |
| 8 | 53 | 330 | 69 | 7.6 | — |
| 9 | 53 | 203 | 69 | 5.7 | — |
| 10 | 45 | 370 | 20 | 3.2 | 3.1 |
|   | 45 | 370 | 30 | 3.9 | 3.5 |
|   | 45 | 370 | 40 | 4.8 | 3.75 |

The foregoing description and the drawings are illustrative and are not to be taken as limiting. Still other variations and modifications are possible without departing from the spirit and scope of the present invention.

We claim:

1. A gas/liquid contactor module suitable for controlling the quantity of dissolved gas in a liquid, which comprises a module containing a plurality of hollow fiber membranes having a shell side comprised of the space surrounding the exterior of the fibers and filling the interior of the module containing liquid and a bore side comprised of the space in the bores of the hollow fibers containing gas, the hollow fiber membranes having an average pore size less than 500 Angstroms and a surface having less than 0.1% holes, the membranes being non-floodable and having a P/I for carbon dioxide greater than about $50 \times 10^{-6}$ to about $5,000 \times 10^{-6}$ cm$^3$/cm$^2$·sec·cmHg, and the module having at least about 25 sq cm of membrane surface per ml of liquid volume for a liquid flow rate of about 2 liters/minute.

2. The module of claim 1 wherein the P/I for carbon dioxide is greater than about $100 \times 10^{-6}$ to about $5,000 \times 10^{-6}$ cm$^3$/cm$^2$·sec·cmHg.

3. A process for controlling the quantity of a dissolved gas in a liquid to a predetermined level which comprises:

placing the liquid under a predetermined pressure;

transporting the pressurized liquid into the shell side of a gas/liquid contactor module containing hollow fiber membranes, the module having a shell side comprised of the space surrounding the exterior of the fibers and filling the interior of the module and a bore side comprised of the space in the bores of the hollow fibers, the hollow fiber membranes having an average pore size less than about 500 Angstroms and a membrane surface having less than 0.1% holes, the membranes being non-floodable and having a P/I for carbon dioxide greater than about $50\times10^{-6}$ to about $5,000\times10^{-6}$ $cm^3/cm^2 \cdot sec \cdot cmHg$, and the module having at least about 25 sq cm of membrane surface per ml of liquid volume for a liquid flow rate of about 2 liters/minute; and increasing or decreasing the quantity of the dissolved gas in the liquid by increasing or decreasing the pressure of the gas in the bores of the hollow fibers by an appropriate amount to obtain the predetermined level of the dissolved gas.

4. The process of claim 3 wherein the liquid is water and the dissolved gas is carbon dioxide.

5. The process of claim 3 wherein the liquid is a beverage.

6. The process of claim 5 wherein the beverage is beer and the dissolved gas is carbon dioxide.

7. The process of claim 5 wherein the beverage is beer and the dissolved gas is nitrogen.

8. The process of claim 5 wherein the beverage is beer and the dissolved gas is comprised of carbon dioxide and nitrogen.

9. The process of claim 3 wherein the pressurized liquid is beer and is passed into a first gas/liquid contactor module wherein the dissolved carbon dioxide is decreased to a predetermined level whereupon the pressurized beverage is passed from the first contactor module to a second gas/liquid contactor module wherein dissolved nitrogen is increased to obtain a predetermined level of nitrogen without substantially altering the level of the dissolved carbon dioxide.

10. The process of claim 9 wherein the process is continuous providing a feed system for a bottling operation.

11. The process of claim 9 wherein the beer after treatment is removed from the contactor module under pressure and dispensed at a tap.

12. The process of claim 11 wherein the dissolved nitrogen is present in an amount from about 15 to about 80 ppm.

13. The process of claim 12 wherein the beer under pressure is at a pressure sufficient to provide a flow rate of at least about 2 liters/minute.

14. The process of claim 3 wherein the pressurized liquid is beer and is passed into a first gas/liquid contactor module wherein the dissolved nitrogen is increased to a predetermined level whereupon the pressurized beverage is passed from the first contactor module to a second gas/liquid contactor module wherein dissolved carbon dioxide is increased or decreased to obtain a predetermined level of carbon dioxide without substantially altering the level of the dissolved nitrogen.

15. The process of claim 14 wherein the process is continuous providing a feed system for a bottling operation.

16. The process of claim 14 wherein the beer after treatment is removed from the contactor module under pressure and dispensed at a tap.

17. The process of claim 16 wherein the dissolved nitrogen is present in an amount from about 15 to about 80 ppm.

18. The process of claim 17 wherein the beer under pressure is at a pressure sufficient to provide a flow rate of at least about 2 liters/minute.

19. A process for controlling the quantities of dissolved carbon dioxide and dissolved nitrogen in beer to predetermined levels which comprises:

placing the beer under a predetermined pressure;

transporting the pressurized beer into the shell side of a contactor module containing hollow fiber membranes, the module having a shell side comprised of the space surrounding the exterior of the fibers and filling the interior of the module and a bore side comprised of the space in the bores of the hollow fibers, the hollow fiber membranes having an average pore size less than about 500 Angstroms and a surface having less than 0.1% holes, the membranes being non-floodable and having a P/I for carbon dioxide greater than about $50\times10^{-6}$ to about $5,000\times10^{-6}$ $cm^3/cm^2 \cdot sec \cdot cmHg$, and the module having at least about 25 sq cm of membrane surface per ml of liquid volume for a liquid flow rate of about 2 liters/minute;

increasing or decreasing the carbon dioxide content of the beer by increasing or decreasing the pressure of carbon dioxide in the bores of the hollow fibers by an appropriate amount; and subsequently increasing the nitrogen content of the beer by increasing the pressure of nitrogen in the bores of the hollow fibers by an appropriate amount.

20. An apparatus for the control of dissolved gases in a beverage comprising:

a contactor module containing non-flooding hollow fiber membranes, the module having a shell side comprised of the space surrounding the exterior of the fibers and filling the interior of the module and a bore side comprised of the space in the bores of the hollow fibers, the hollow fiber membranes having an average pore size less than about 500 Angstroms and a surface having less than 0.1% holes, the membranes being non-floodable and having a P/I for carbon dioxide greater than about $50\times10^{-6}$ to about $5,000\times10^{-6}$ $cm^3/cm^2 \cdot sec \cdot cmHg$, and the module having at least about 25 sq cm of membrane surface per ml of liquid volume for a liquid flow rate of about 2 liters/minute;

means for pressurizing the beverage to a predetermined pressure;

means for controlling the flow of the pressurized beverage to the shell side of the contactor module; and means for controlling the pressure of a dissolving gas in the bores of the hollow fibers.

21. The apparatus of claim 20 wherein the means for controlling the flow of the pressurized beverage to the shell side of the contactor module is a check valve.

22. A process utilizing a single contactor module for preparing an alcoholic beverage having predetermined quantities of each of dissolved nitrogen and dissolved carbon dioxide which comprises:

placing the beverage under a predetermined pressure;

transporting the pressurized beverage into the shell side of the contactor module containing hollow fiber membranes, the module having a shell side comprised of the space surrounding the exterior of the fibers and filling the interior of the module and a bore side comprised of the space in the bores of the hollow fibers, the hollow fiber membranes having an average pore size less than about 500 Angstroms and a surface having less than 0.1% holes, the membranes being non-floodable and having a P/I for carbon dioxide greater than about $50\times10^{-6}$ to about $5,000\times10^{-6}$ $cm^3/cm^2 \cdot sec \cdot cmHg$, and the module having at least about 25 sq cm of membrane surface per ml of liquid volume for a liquid flow rate of about 2 liters/minute; and increasing the quantity of the dissolved nitrogen in the beverage by increasing the pressure of the nitrogen in the bores of the hollow fibers by an appropriate amount to obtain a predetermined level of dissolved nitrogen in bubble-less form in the beverage while continuously maintaining the pressure of the beverage;

substantially removing the nitrogen from the bores of the hollow fibers; and increasing or decreasing the quantity of the dissolved carbon dioxide in the beverage by increasing or decreasing the pressure of the carbon dioxide in the bores of the hollow fibers by an appropriate amount to obtain a predetermined level of dissolved carbon dioxide in the beverage while continuously maintaining the pressure of the beverage and retaining the dissolved carbon dioxide and dissolved nitrogen in bubble-less form in the beverage.

23. A process for the carbonation of water for a soda dispense system comprising:

transporting pressurized water through a check valve into the shell side of a contactor module containing a plurality of hollow fiber membranes having a shell side comprised of the space surrounding the exterior of the fibers and filling the interior of the module containing liquid and a bore side comprised of the space in the bores of the hollow fibers containing gas, the hollow fiber membranes having an average pore size less than about 500 Angstroms and a surface having less than 0.1% holes, the membranes being non-floodable and having a P/I for carbon dioxide greater than about $50 \times 10^{-6}$ to about $5,000 \times 10^{-6}$ cm$^3$/cm$^2$·sec·cmHg, and the module having at least about 25 sq cm of membrane surface per ml of liquid volume for a liquid flow rate of about 2 liters/minute;

maintaining the water pressure in the contactor module at least about 20 psig;

simultaneously passing carbon dioxide under pressure through the bores of the membranes at a pressure sufficient to provide the desired carbonation of the water in bubble-less form; and controlling each of the water pressure and the carbon dioxide pressure so that the shell side of the contactor module contains only liquid, and passing bubble-less carbonated water under pressure to a soda dispense station.

24. The apparatus of claim 23 including a means for venting the bores of the hollow fibers to the atmosphere.

25. A carbonation apparatus, suitable for the carbonation of water, the carbonated water to be used at a soda dispense station, the apparatus comprising:

a gas/liquid contactor module containing a plurality of hollow fiber membranes having a shell side comprised of the space surrounding the exterior of the fibers and filling the interior of the module containing liquid and a bore side comprised of the space in the bores of the hollow fibers containing gas, the hollow fiber membranes having an average pore size less than about 500 Angstroms and a surface having less than 0.1% holes, the membranes being non-floodable and having a P/I for carbon dioxide greater than about $50 \times 10^{-6}$ to about $5,000 \times 10^{-6}$ cm$^3$/cm$^2$·sec·cmHg, and the module having at least about 25 sq cm of membrane surface per ml of liquid volume for a liquid flow rate of about 2 liters/minute;

a source of water under pressure connected for shell side feed to the module;

a source of carbon dioxide under pressure connected for fiber bore side feed to the module;

a control to regulate the pressure of the carbon dioxide independent of but in relation to the water pressure to prevent formation of any gas on the shell side of the contactor module;

a check valve located at the water feed inlet as the last control of the water as it enters the shell side of the module, and a temperature control to control the temperature of the water while the water is in the module and until the resulting carbonated water is dispensed.

26. The apparatus of claim 25 including a water flow regulator upstream of the check valve.

* * * * *